United States Patent [19]
Ogawa et al.

[11] Patent Number: 5,466,523
[45] Date of Patent: Nov. 14, 1995

[54] HYDROPHILIC CHEMICALLY ADSORBED FILM

[75] Inventors: Kazufumi Ogawa, Hirakata; Norihisa Mino, Settu; Mamoru Soga, Osaka, all of Japan

[73] Assignee: Matsushita Electric Industrial Co., Ltd., Osaka, Japan

[21] Appl. No.: 250,943

[22] Filed: May 31, 1994

Related U.S. Application Data

[63] Continuation of Ser. No. 872,836, Apr. 23, 1992, abandoned.

[30] Foreign Application Priority Data

| Apr. 30, 1991 | [JP] | Japan | 3-098906 |
| Apr. 30, 1991 | [JP] | Japan | 3-098918 |
| Jun. 14, 1991 | [JP] | Japan | 3-143499 |

[51] Int. Cl.$^6$ .................................. B32B 7/04
[52] U.S. Cl. .................. 428/333; 428/446; 428/447; 428/448; 428/451
[58] Field of Search ................ 428/333, 446, 428/447, 448, 451

[56] References Cited

U.S. PATENT DOCUMENTS

| 3,781,251 | 12/1973 | Hermes | 536/255 |
| 4,539,061 | 9/1985 | Sagiv | 156/278 |
| 4,847,160 | 7/1989 | Munz et al | 428/447 |
| 4,992,300 | 2/1991 | Ogawa et al. | 427/44 |

FOREIGN PATENT DOCUMENTS

| 0393551 | 10/1990 | European Pat. Off. . |
| 0492545 | 7/1992 | European Pat. Off. . |
| 1459124 | 10/1966 | France . |
| 3706782 | 9/1988 | Germany . |
| 62-177071 | 8/1987 | Japan . |

Primary Examiner—D. S. Nakarani
Attorney, Agent, or Firm—Fish & Richardson

[57] ABSTRACT

A chemically adsorbed film containing hydrophilic groups is formed on a substrate such that it is chemically bonded by Si covalent bonds to the substrate. The adsorbed film has an improved hydrophilic property. In addition, the film provides an excellently durable and transparent fog-proof substrate. According to the method of the invention, a substrate containing hydrophilic groups is contacted with a non-aqueous solution containing a surface active material having straight chain molecules each having at one end a chlorosilyl group and at the other end at least one functional group selected from the group consisting of a bromo group, iodo group, cyano group, thiocyano group, chlorosilyl group etc. to cause a dehydrochlorination reaction between hydrophilic groups on the substrate surface and chlorosilyl groups of the surface active material, thereby forming a chemically adsorbed film on the substrate surface. The functional group at the other end of the surface active material is converted into at least one hydrophilic group selected from the group consisting of —OH, —COOH, —NH$_2$, =NH, —N$^+$R$_3$X$^-$ (X representing a halogen atom, R represents a lower alkyl group), —NO$_2$, —SH, and —S)$_3$H groups.

4 Claims, 18 Drawing Sheets

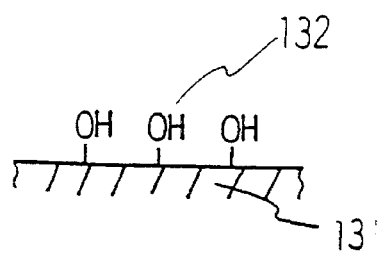
Figure-12(a)
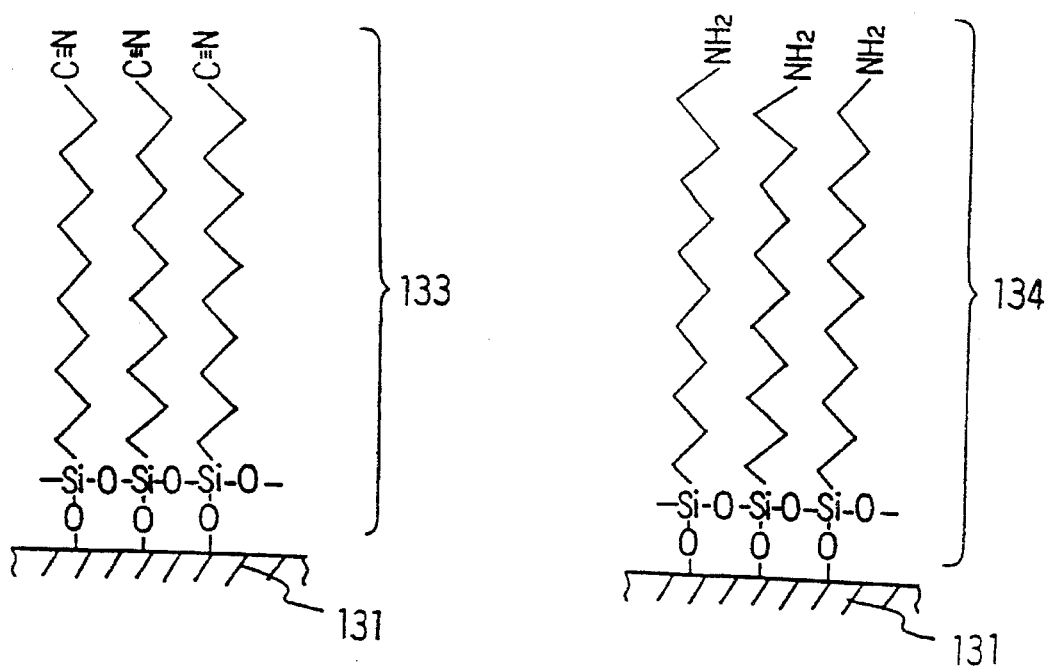
Figure-12(b)
Figure-12(c)

HYDROPHILIC CHEMICALLY ADSORBED FILM

This application is a continuation of U.S. application Ser. No. 07/872,836 filed Apr. 23, 1992, now abandoned.

FIELD OF THE PRESENT INVENTION

The present invention relates to a hydrophilic chemically adsorbed film and a method of manufacturing the same. More particularly, the invention relates to a hydrophilic chemically adsorbed film, in which hydrophilic functional groups are secured by chemical bonds to chemically adsorbed molecules, and a method of manufacturing the same.

The invention also relates to a fog-proof substrate for an optical material, which substrate utilizes the hydrophilic chemically adsorbed film noted above, and the surface of which is made hydrophilic. More particularly, the invention relates to a fog-proof substrate with a hydrophilic chemically adsorbed film formed on the surface of a bathroom mirror, a make-up mirror, a window glass, a vehicle window glass, a back mirror and an optical lens.

The invention further relates to a highly durable, fog-proof, oil-repelling monomolecular film or a fog-proof, oil-repelling laminated film utilizing the hydrophilic chemically adsorbed film noted above. More particularly, the invention relates to a fluorocarbon-based chemically adsorbed film or a chemically adsorbed laminated film with an aim of providing fog-proof and oil-repelling properties at the surface of a transparent substrate, the film having a thickness at the nanometer level, being hydrophilic and highly oil-repelling and having the surface covered by hydrophilic groups.

BACKGROUND OF THE INVENTION

It has been required in various fields to make the surface of a hydrophobic material hydrophilic. For example, it is required to make the surface of plastics, fibers, ceramics and like materials hydrophilic. Taking synthetic fibers, for example, if the surface of polyester, polyolefin and like synthetic fibers can be made hydrophilic, their use for clothing such as underwear and their industrial use such as wipers are expected to be further increased. It is important in industries to provide a technique of forming richly versatile molecules as a method of manufacturing a chemically adsorbed film, which is hydrophilic to a desired extent.

Heretofore, plasma treatment or the like is well known as means for making the surface of plastics, fibers, ceramics and like material hydrophilic.

As a different means, the Ogawa method has been proposed in which functional groups having particular functions are incorporated in advance in a surface active material for chemical adsorption to form a specific chemically adsorbed film, as disclosed in, for example, U.S. Pat. No. 4,673,474.

However, plasma treatment can not impart a sufficient hydrophilic property. In addition, its process is complicated. Further, with the above Ogawa method it is difficult to incorporate in advance hydrophilic groups in the surface active material itself, thus imposing great restrictions on the manufacture of chemically adsorbed films which are hydrophilic to a desired extent. That is, this method is poorly versatile.

When the relative humidity is high or during the low temperature winter season, fog may be produced, for example, on vehicle window glass or on bathroom mirrors. Fog is produced due to inferior heat conductivity of the optical substrate of the vehicle window glass or bathroom mirror. When the atmospheric temperature is suddenly increased or when one surface contacts a high temperature air atmosphere while the other surface remains cool, water content in the air is condensed on the surface. This is referred to as fog. In the rainy season, for example, the relative humidity of air is saturated, and fog is readily produced with condensation as one breathes or sweats. It is well known in the art to prevent this fog formation by applying coating chemicals or resins containing hydrophilic compounds such as polyvinyl alcohol and polyethylene glycol on the optical material surface or applying hydrophilic film thereto.

However, by coating hydrophilic resins on the optical material surface or applying hydrophilic film thereto, the transparency of the material is sacrificed. In addition, separation or flaws may occur. Further, the method of coating hydrophilic chemicals or resins poses problems in that durability is low, although the cost is low.

Heretofore, there have been various proposals of providing a fog-proof property to the surface, which can be readily fogged by steam or water drops such as on window glass, bathroom mirrors and glass lenses.

There are many proposed methods of improving the fog-proof property of glass, plastic and other substrates; for example a method of coating a hydrophilic coating film of denatured polyethylene glycol or poly(hydroxyethyl methacylate) or a method of coating various silicone-based resins.

The silicone-based resins, however, are less transparent, and therefore they require a very small coating thickness if they are to be coated while maintaining the color tone or luster of the substrate. However, since they are less hard and have an inferior scratch-proof property, by reducing the thickness of coating film durability is reduced. Likewise, denatured polyethylene glycol or poly(hydroxyethyl methacrylate) is poorly wear-resistant and inferior in durability.

SUMMARY OF THE INVENTION

An object of the invention is to provide a chemically adsorbed film incorporating hydrophilic groups and a method of manufacturing the same, which can solve the above problems inherent in the prior art.

Another object of the invention is to provide a fog-proof substrate with a highly transparent and durable, desirably fog-proof hydrophilic coating film provided on the surface of an optical material, which can solve the above problems inherent in the prior art.

A further object of the invention is to provide a fluorocarbon-based coating film, which is excellently fog-proof and oil-repelling, maintains the color tone or luster of the substrate, is less prone to damage, has high scratch resistance and has a hydrophilic surface, by utilizing a monomolecular film having a thickness at the nanometer level and having a uniform thickness either as a laminated film or a non-laminated film, thus solving the problems inherent in the prior art.

According to a first aspect of the invention we provide a hydrophilic chemically adsorbed film comprising a straight carbon chain having a stem bonded by covalent Si bonds to a substrate surface, wherein the chemically adsorbed film contains hydrophilic groups at outermost surface.

It is preferable in this invention that the hydrophilic groups include at least one functional group selected from the group consisting of —CN, —SCN, —OH, —COOH, —NH$_2$, =NH, —N$^+$R$_3$X$^-$ (X represents a halogen atom, R represents a lower alkyl group),—NO$_2$, —SH, and —SO$_3$H groups.

It is preferable in this invention that the hydrogen atom in the —COOH or —SO$_3$H group is substituted by an alkali metal, an alkali earth metal or other metals.

It is preferable in this invention that the chemically adsorbed film is a monomolecular film or a polymer film.

It is preferable in this invention that the substrate is a optical substrate.

It is preferable in this invention that the hydrophilic chemically adsorbed film is laminated on the surface of an inner layer containing siloxane bonds.

It is preferable in this invention that the chemically adsorbed film contains a fluorocarbon group and the surface thereof contains hydrophilic groups.

It is preferable in this invention that the chemically adsorbed film includes a fluorine-containing laminated film.

According to a second aspect of the invention we provide a method of manufacturing a hydrophilic chemically adsorbed film comprising:

A) contacting a substrate containing hydrophilic groups with a non-aqueous solution containing a surface active material having a straight chain group having at one end a chlorosilyl group and at the other end at least one functional group selected from the group consisting of a bromo group, iodo group, cyano group, thiocyano group, chlorosilyl group and an organic group having an ester bond to cause a dehydrochlorination reaction between hydrophilic groups on the substrate surface and chlorosilyl groups of the surface active material, thereby forming a chemically adsorbed film on the substrate surface, and B) converting the functional group at the other end of the surface active material into at least one hydrophilic group selected from the group consisting of —OH, —COOH, —NH$_2$, =NH, —N$^+$R$_3$X$^-$ (X representing a halogen atom, R represents a lower alkyl group), —NO$_2$, —SH, and —SO$_3$H groups.

It is preferable in this invention that the surface active material containing the chlorosilyl group is represented by the formula

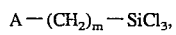

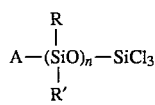

or the formula

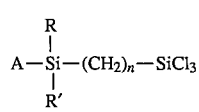

where A represents at least one functional group selected from the group consisting of a bromo group, an iodo group, a cyano group, a thiocyano group, a chlorosilyl group or an organic group containing an ester bond, and m and n represent integers in a range from 1 to 30, R, R' represents alkyl group, alkoxyl group or aryl group.

It is preferable in this invention that the functional group at the other end of the surface active material is converted to a —COOH or —SO$_3$H group, and then the hydrogen atom in the carboxylic acid group or said sulfonic acid group is substituted by an alkali metal or an alkali earth metal or other metals.

It is preferable in this invention that the chemically adsorbed film is a monomolecular film or a polymer film.

It is preferable in this invention that the substrate containing hydroxyl groups at the surface is made of a material selected from the group consisting of glass, metals, ceramics and plastics.

It is preferable in this invention that the substrate containing hydroxyl groups at the surface is a substrate having the surface thereof made hydrophilic by a treating in an oxygen-containing plasma atmosphere.

According to a third aspect of the invention we provide a method of manufacturing a hydrophilic chemically adsorbed film comprising:

a) contacting a substrate containing hydrophilic groups with a non-aqueous solution containing a fluorocarbon-based surface active material having chlorosilyl groups at both molecular ends to cause a reaction between hydroxyl groups on the substrate surface and chlorosilyl groups at one molecular end of the fluorocarbon-based surface active material, and b) washing with a non-aqueous organic solution and reacting with water, thereby forming on the substrate a chemical adsorbed film having hydroxyl groups secured to the substrate surface.

It is preferable in this invention that the fluorocarbon-based surface active material containing the chlorosilyl groups at both molecular ends is represented by the formula

where n represents an integer, R$^1$ and R$^2$ represent an alkylene group or a substituted group containing a Si or oxygen atom, X represents a hydrogen atom, an alkyl or an alkoxy group and p and q represent 1 or 2.

It is preferable in, this invention that the fluorocarbon-based, surface active material containing the chlorosilyl groups at one molecular end is represented by the formula

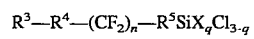

where n represents an integer, R$^3$ represents an unsaturated group or a dimethylsilyl group, R$^4$ and R$^5$ represent an alkylene group or a substituted group containing a Si or oxygen atom, X represents a hydrogen atom, an alkyl or an alkoxyl substitution group, and q represents 0, 1 or 2.

According to a fourth aspect of the invention we provide a method of manufacturing a hydrophilic chemically adsorbed film comprising:

i) contacting a substrate containing hydrophilic groups with a non-aqueous solution containing a surface active material having a chlorosilyl group at one molecular end and a reactive functional unsaturated group at the other molecular end to cause a reaction between hydroxyl groups of the substrate surface and chlorosilyl groups at one molecular end of the surface active material, ii) removing non-reacted surface active material remaining on the substrate by washing with a non-aqueous organic solution, thereby forming a chemically adsorbed inner layer film on the substrate, iii) converting the reactive functional groups on the surface of the inner layer film into groups which are ractive with the chlorosilyl group, iv) contacting the substrate with a non-aqueous solution containing a fluorocarbon-based surface active material containing chlorosilyl groups at opposite ends to cause a reaction between active groups of the inner layer film and chlorosilyl groups at one molecular end of the fluorocarbon-based surface active material, and v) removing non-reacted fluorocarbon-based surface active material remaining on the substrate by washing with a non-aqueous organic solution and then reacting with water, thereby forming a hydrophilic laminated fluorocarbon-based chemically adsorbed film bonded to the inner layer film.

BRIEF DESCRIPTION OF THE DRAWINGS

FIGS. 12 (a)–(c) show a window glass as in example 12 of the invention.

DETAILED DESCRIPTION OF THE INVENTION

Figure 1:
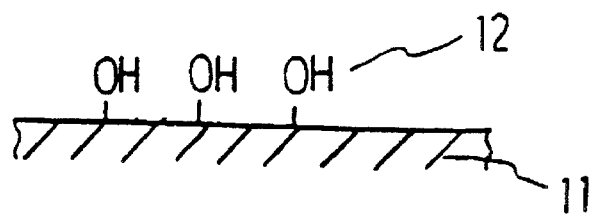
FIGS. 1 (a)–(b) show a glass substrate as in example 1 of the invention.
Figure 1:
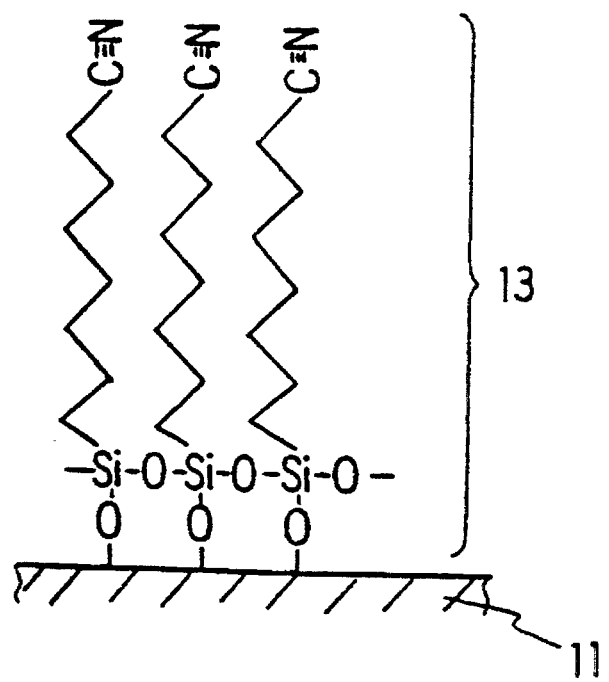

According to the invention, hydrophilic functional groups are secured by chemical bonds and via chemically adsorbed molecules to a substrate surface. Thus, there is no need of incorporating in advance a particular hydrophilic group in the surface active material, and it is possible to manufacture a chemically adsorbed monomolecular film, which is hydrophilic to a comparatively freely controllable extent.

To provide the fog-proof property, a readily ionizable functional group is used as the hydrophilic group.

More specifically, according to the invention a fog-proof substrate is provided, which is an optical material with a chemically adsorbed monomolecular film provided on the substrate surface. The monomolecular film features a coating film that is provided with straight chain molecules containing hydrophylic groups chemically bonded via siloxane bonds.

A preferred structure according to the invention is that the hydrophilic group is at least one functional group selected from the group consisting of —OH, —COOH, —NH$_2$, —N$^+$R$_3$X$^-$ (R representing an lower alkyl group, X representing a halogen atom), —NO$_2$ and —SO$_3$H groups. Further, in the above structure the hydrogen atom of the —COOH or —SO$_3$H group is preferably substituted by an alkali metal, an alkali earth metal or other metals. For example, an alkali metal selected from lithium, sodium, potassium, rubidium, cesium, francium, an alkali earth metal selected from beryllium, magnesium, calcium, strontium, barium, radium, and other metals selected from chromium, manganese, iron, cobalt, nickel, copper, zirconium etc.

Further, with the above structure of the fog-proof substrate according to the invention, in which straight chain molecules containing hydrophilic functional groups are secured via siloxane bonds to the substrate surface of the optical material, when condensation forms on the surface, water drops wet the substrate surface and do not produce fog which extends over the entire surface. Further, since the monomolecular film is chemically adsorbed, it does not separate. Further, since it has a thickness at the nanometer level, it is excellently transparent, does not interfere with the optical performance of the substrate and may be made excellently durable.

Further, when it is desired to provide an oil-repelling property in addition to hydrophilic property, fluorine atoms are introduced in advance. More particularly, a fluorine-containing monomolecular film is formed on a substrate surface via siloxane bonds, and hydrophilic groups are secured to the surface of the chemically adsorbed film. It is thus possible to further improve the fogging-proof and oil-repelling properties of the chemically adsorbed film.

The chlorosilane-based surface active material capable of use according to the invention is not limited to those in the form of a straight chain as noted above. It is possible to use a branched alkyl fluoride or hydrocarbon group or those having a substituted alkyl fluoride or hydrocarbon group with silicon at one end (i.e., those represented by the formula R$_2$SiCl$_2$, R$_3$SiCl, R$^6$R$^7$SiCl$_2$ or R$^6$R$^7$R$^8$SiCl, where R, R$^6$, R$^7$ and R$^8$ represents an fluorocarbon group or hydrocarbon group). To increase the adsorption density, however, the straight chain form is preferred.

Further, by chemically adsorbing a material having a plurality of chlorosilyl groups, e.g., SiCl$_4$, SiHCl$_3$, SiH$_2$Cl$_2$, and Cl(SiCl$_2$O)$_n$SiCl$_3$ (where n represents an integer in a range from 1 to 20), for forming an inner layer, and then reacting it with water, surface chlorosilyl bonds are converted to hydrophilic silanol bonds, thus making the hydrophilic monomolecular on the substrate before making the hydrophilic monolayer. Among the materials containing a plurality of chlorosilyl groups, tetrachlorosilane (SiCl$_4$) is preferred in that it is highly reactive and ion in molecular height. It can, therefore, provide silanol bonds at a high density. In this way, it is possible to make a substrate highly hydrophilic. Moreover to this surface, a chlorosilane-based surface active material containing fluorocarbon groups may be chemically adsorbed. In this way, a chemically adsorbed film suitably having an increased density can be obtained.

According to the invention, any substrate may be used which contains —OH, —COOH, —NH$_2$, =NH or other hydrophilic groups at its surface. A substrate such as a plastic film containing relatively few hydroxyl groups at the surface, may be chemically treated by means such as ozone oxidation, plasma treatment, corona treatment, or electron beam irradiation to obtain a substrate containing increased hydrophilic groups and which are suitable for the invention. Polyamide resins and polyurethane resins have surface imino groups (=NH) and therefore do not require any pre-treatment.

Since the surface active material reacts with water, the non-aqueous organic solvent to be used according to the invention may have as low a water content as possible and sufficiently dissolves the surface active material. Examples are those solvents which have long chain alkyl groups, aromatic hydrocarbons, saturated ring compound and halogen-containing hydrocarbons.

The following description of examples concerns chemical adsorbed monomolecular films having —CN, —SCN, —OH, —COOH, —NH$_2$, =NH, —N$^+$R$_3$X$^-$, —NO$_2$, —SH, and —SO$_3$H groups (X represents a halogen atom, R represents an alkyl group).

EXAMPLE 1

(introduction of a cyano (—CN) group)

A hydrophilic glass substrate 11 was prepared (FIG. 1(a)) and washed with organic solvent. The glass substrate was dipped and held for about two hours in a non-aqueous solution containing an adsorbed material having a cyano and a chlorosilyl group, e.g., a mixed solution of 80% by weight of n-hexadecane (or toluene, xylene or bicyclohexyl), 12% by weight of carbon tetrachloride, and 8% by weight of chloroform, containing 1% by weight of NC(CH$_2$)$_7$SiCl$_3$.

A dehydrochlorination reaction was thus brought about between chlorosilyl (—SiCl) groups in the adsorbed material and hydroxyl groups 12 numerously contained at the glass substrate surfaces. This reaction is represented in the following formula [1].

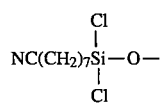
[Formula 1]

The glass substrate was then washed with chloroform to remove unreacted material remaining on the surface, followed by washing with water or exposing to air containing moisture. The residual —SiCl group was changed to a —SiOH group as in formula [2].

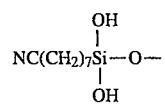
[Formula 2]

Each silanol group was then dehydrated and crosslinked to form a siloxane bond (—SiO—) after drying as in the formula [3]. Drying temperature may be room temperature or above.

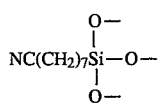
[Formula 3]

By subsequently washing the glass substrate, a monomolecular film 13 containing cyano groups (FIG. 1(b)) was formed. The adsorbed monomolecular film was chemically bonded (i.e., covalently bonded) to the glass substrate surfaces. The chemical bond is via a siloxane bond. The formation of the chemically adsorbed monomolecular film was confirmed by FTIR spectroscopy and the thickness was about 1.5 nm. It was very firmly chemically (or covalently) bonded to the fibers and did not separate.

The above washing step with the non-aqueous organic solution (chloroform) was omitted, and a polymer film was adsorbed to the substrate surface. The polymer film was in satisfactorily close adherence to the substrate. The film was substantially pin-hole free.

EXAMPLE 2

(introduction of a thiocyano (—SCN) group)

Figures 2A, 2B:
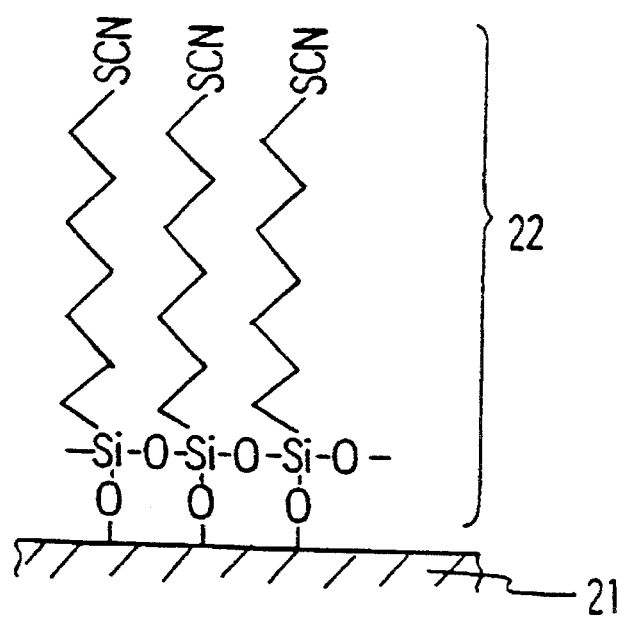
FIGS. 2 (a)–(b) show a glass substrate as in example 2 of the invention.

A hydrophilic glass substrate 21 was prepared (FIG. 2(a)) and washed with organic solvent. The glass substrate was dipped and held for about five hours in a non-aqueous solution containing an adsorbed material having a thiocyano and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of NCS(CH$_2$)$_7$SiCl$_3$.

A dehydrochlorination reaction was thus brought about between chlorosilyl (—SiCl) groups in the adsorbed material and hydroxyl groups numerously contained at the substrate surfaces. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [4]. Drying temperature may be room temperature or above.

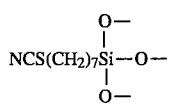
[Formula 4]

A monomolecular flim 22 containing thiocyano groups was thus formed. The film was chemically bonded (or covalently bonded) to the substrate surfaces. The chemical bond is via a siloxane bond. The formation of the chemically adsorbed monomolecular film was confirmed by FTIR spectroscopy and the thickness was about 1.5 nm (FIG. 2(b)). It was very firmly chemically (or covalently) bonded to the fibers and did not separate.

The above washing step with the non-aqueous organic solution (chloroform) was omitted, and a polymer film was adsorbed to the substrate surface. The polymer film was in satisfactorily close adherence to the substrate. The film was substantially pin-hole free.

EXAMPLE 3

(introduction of a hydroxyl (—OH) group)

Figure 3A:
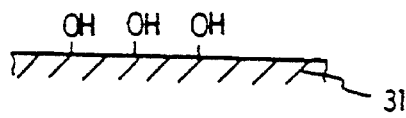
FIGS. 3 (a)–(d) show a glass substrate as in example 3 of the invention.

A hydrophilic glass substrate 31 (FIG. 3(a)) was prepared and washed with an organic solvent and then dipped and held for about five hours in a non-aqueous solution containing an adsorbed material having an ester (R—COOCH$_2$—, R represents a functional group) bond and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of H$_3$COOC(CH$_2$)$_7$SiCl$_3$. A dehydrochlorination reaction was thus brought about between chlorosilyl (—SiCl) groups in the material containing an ester bond and a chlorosilyl group and hydroxyl groups contained numerously at the substrate surfaces. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [5]. Drying temperature may be room temperature or above.

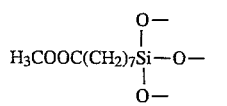

[Formula 5]

Figure 3B:
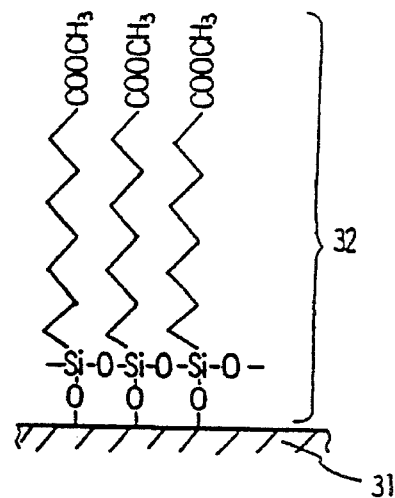

A monomolecular film 32 containing ester bonds thus was formed. The film was chemically bonded (or covalently bonded) to the substrate surfaces, and its thickness was about 1.5 nm (FIG. 3(b)).

Figure 3C:
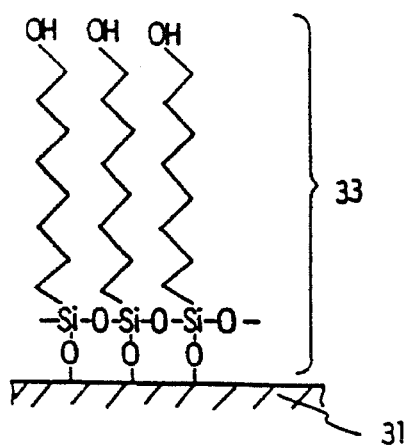

The treated substrate was then reacted in an ether solution containing several per cent by weight of lithium aluminium hydride (LiAlH$_4$) at a temperature below room temperature for 20 minutes to introduce hydrophilic hydroxyl end groups so as to form a monomolecular film 33 (FIG. 3(c)) represented by formula [6].

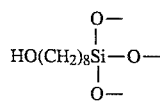

[Formula 6]

Figure 3D:
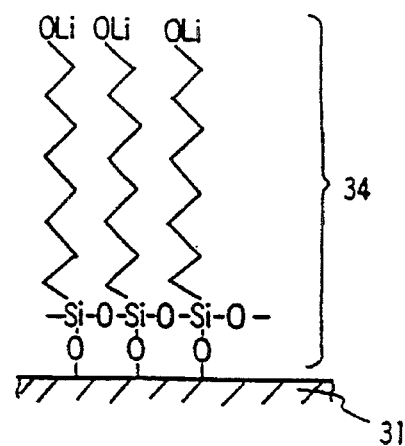

The monomolecular film 33 was very firmly chemically bonded (or covalently bonded) to the substrate and did not separate. The substrate was further dipped in a hexane solution containing an organic compound of an alkali metal, e.g., LiO(CH$_2$)$_3$CH$_3$ (or NaOCH$_3$) to form a very lighly hydrophilic film 34 (FIG. 3(d)) represented by formula [7].

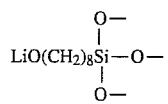

[Formula 7]

As another example, the glass substrate was washed with an organic solvent and then reacted with a material containing a plurality of chlorosilyl groups, e.g., SiCl$_4$. The substrate was subsequently washed with a solvent, e.g., freon 113, and then washed with water. As a result, unreacted SiCl$_4$ molecules remaining on the substrate surface were removed to obtain a siloxane monomolecular film as represented by formulas [A] and/or [B].

A siloxane monomolecular film abundantly containing hydroxyl (—OH) groups thus could be formed. The film was chemically (or covalently) bonded to the substrate surface, and its thickness was about 0.3 nm. Subsequent to the above chemical adsorption of SiCl$_4$, the process in Example 1, 2 or 3 was carried out. Thus, a hydrophilic monomolecular film could be formed with a higher density on the substrate surface via the siloxane monomolecular film. The film did not separate by washing or wiping.

EXAMPLE 4

(introduction of a carboxyl (—COOH) group)

Figure 4A:
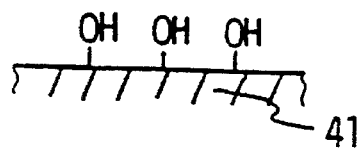
FIGS. 4 (a)–(d) show a glass mirror as in example 4 of the invention.

A hydrophilic glass mirror substrate 41 was prepared (FIG. 4(a)), washed well and dipped and held for about five hours in a non-aqueous solution containing an adsorbed material having an ester bond and a chlorosilyl group in a mixed solution of 80% by weight of n-hexadecane (or toluene, xylene or bicyclohexyl), 12% by weight of carbon tetrachloride, and 8% by weight of chloroform, containing about 2% by weight of H$_3$COOC(CH$_2$)$_{10}$SiCl$_3$. A dehydrochlorination reaction was thus brought about chlorosilyl (—SiCl) groups in the material and hydroxyl groups numerously contained at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [8]. Drying temperature may be room temperature or above.

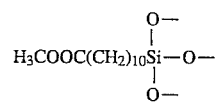

[Formula 8]

Figure 4B:
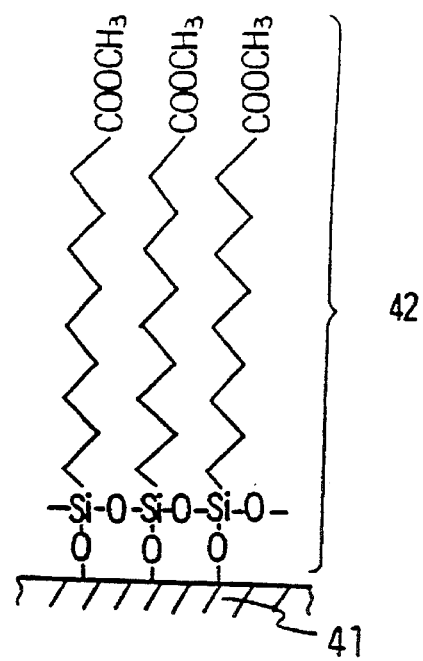

A monomolecular film 42 containing ester bonds thus could be formed. The film was chemically (or covalently) bonded to the substrate surface, and its thickness was about 2.0 nm (FIG. 4(b)).

The treated substrate was then reacted in a solution containing 36% by weight of hydrochloric acid (HCl) at 65° C. for 30 minutes, thus introducing hydrophilic carboxyl end groups as represented by formula [9].

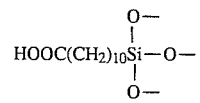

[Formula 9]

Figure 4C:
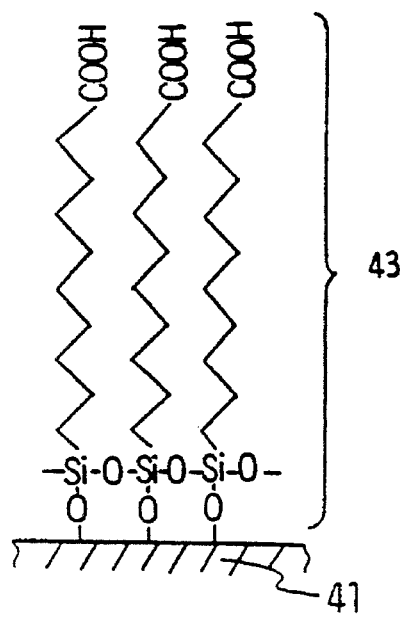

A monomolecular film 43 (FIG. 4(c)) was thus formed. This film again was very firmly chemically (or covalently) bonded and did not separate.

The substrate was then further dipped and held in an aqueous solution containing an alkali,alkali earth metal or other metals compound, e.g., NaOH or Ca(OH)$_2$, and bonds were formed as in formula [10].

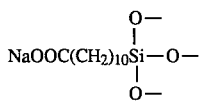 [Formula 10]

Figure 4D:
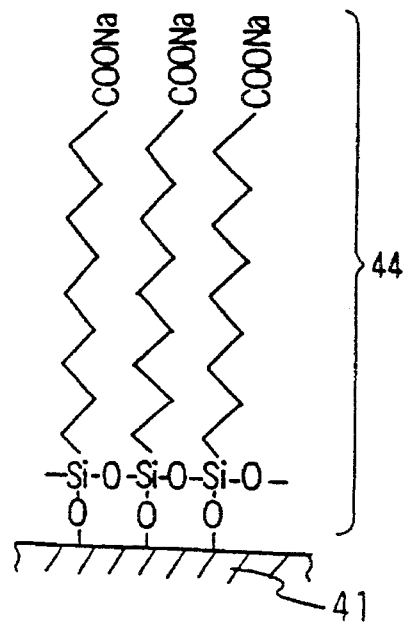

A highly hydrophilic monomolecular film 44 (FIG. 4(d)) thus could be formed on the substrate surface. This film did not separate by washing. The film had a very good hydrophilic property and the mirror had an excellent fog-proof property.

EXAMPLE 5

(introduction of an —$NH_2$ group)

Figure 5A:
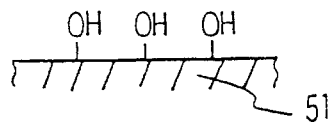
FIGS. 5 (a)–(c) show a glass mirror as in example 5 of the invention.

A hydrophilic glass mirror substrate 51 (FIG. 5(a)) was prepared by dipping and holding for about two hours in a non-aqueous solution containing an adsorbed material having a cyano and a chlorosilyl group, e.g., a mixed solution of 80% by weight of n-hexadecane (or toluene, xylene or bicyclohexyl), 12% by weight of carbon tetrachloride, and 8% by weight of chloroform, containing about 1% by weight of $NC(CH_2)_{17}SiCl_3$.

A dehydrochlorination reaction was thus brought about between —SiCl groups in the adsorbed material containing a cyano and a chlorosilyl group and hydroxyl groups numerously contained at the substrate surfaces. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [11]. Drying temperature may be room temperature or above.

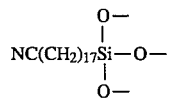 [Formula 11]

Figure 5B:
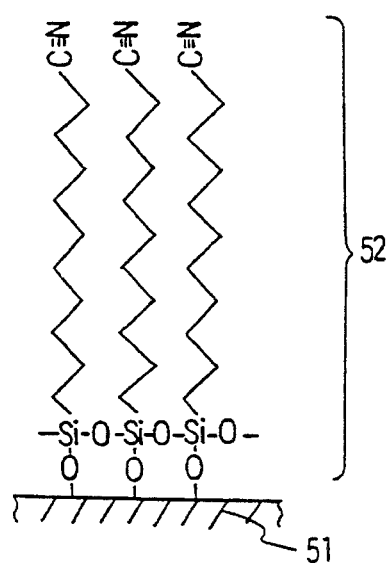

A monomolecular film 52 containing cyano groups thus could be formed. The film was chemically (or covalently) bonded to the substrate surface (FIG. 5(b)).

Figure 5C:
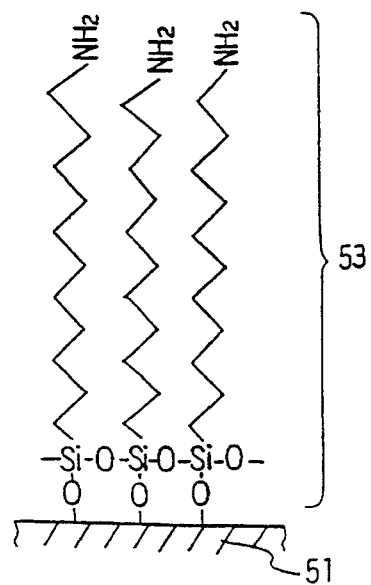

The treated fibers were then dipped and held in ether containing dissolved lithium aluminium hydride (10 mg/ml) for overnight reaction. Then, the substrate was taken out from the solution and added to an ether solution containing 10% by weight hydrochloric acid. Thereafter, the substrate was dipped and held in a triethylamine solution for two hours. The substrate was then washed with chloroform. A highly hydrophilic monomolecular film 53 (FIG. 5(c)) represented by formula [12] was formed.

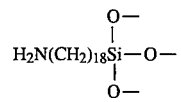 [Formula 12]

This film was firmly chemically (or covalently) bonded to the substrate and did not separate. The formation of chemically adsorbed monomolecular film was confirmed by FTIR spectroscopy and the thickness was about 2.5 nm.

As an additional example of —$NH_2$ group introduction, a hydrophilic glass substrate was prepared. The substrate was washed with an organic solvent and dipped and held for about two hours in a non-aqueous solution containing a bromo or iodo group and a chlorosilyl group, e.g., a mixed solution of 80% by weight of n-hexadecane (or toluene, xylene or bicyclohexyl), 12% by weight of carbon tetrachloride, and 8% by weight of chloroform, containing about 1% by weight of $Br(CH_2)_{17}SiCl_3$.

A dehydrochlorination reaction was thus brought about between —SiCl groups in the material containing the bromo or iodo group and a chlorosilyl group and hydroxyl groups contained numerously at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [13]. Drying temperature may be room temperature or above.

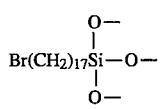 [Formula 13]

A monomolecular film containing bromo groups thus could be formed over the entire substrate surface. The film was chemically (or covalently) bonded to the substrate surfaces.

The treated substrate was then dipped and held in an N,N-dimethyl formamide solution containing dissolved sodium amide (8 mg/ml) for overnight reaction. A monomolecular film represented by formula [14] was obtained.

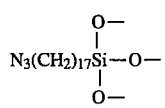 [Formula 14]

The substrate was then dipped and held in ether containing dissolved lithium aluminium hydride (10 mg/ml) for overnight reaction, and then put into an empty container for addition thereto of an ether solution containing 10% by weight hydrochloric acid. Subsequently, the substrate was dipped and held in a triethylamine solution for two hours. The substrate was then washed with chloroform. After drying, a compound as in the formula [15] was formed.

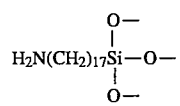 [Formula 15]

This monomolecular film was very firmly chemically (or covalently) bonded to the substrate and did not separated by wiping. The film had a very good hydrophilic property and the glass had an excellent fog-proof property.

EXAMPLE 6

(introduction of an =NH group)

A transparent polycarbonate plate substrate (or acryl resin plate substrate) surface was oxygen plasma treated in a UV dry stripper ("UV-1" manufactured by Samco International Co.) at an oxygen flow rate of 1 liter/min. for 10 minutes to oxidize the surface. The substrate was dipped and held for five hours in a non-aqueous solution containing an adsorbed material having a chlorosilyl group at each end e.g., an "Aflood" solution (a fluorine-based solvent provided by Asahi Glass Co.), prepared by dissolving into the non-aqueous solution about 2% by weight of

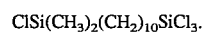

Figure 6A:
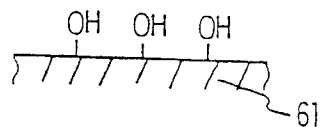
FIGS. 6 (a)–(c) show a transparent polycarbonate plate as in example 6 of the invention.

A dehydrochlorination reaction was thus brought about between chlorosilyl (—SiCl) groups at one end of the material containing the chlorosilyl groups and the hydroxyl groups numerously contained at the substrate surface (FIG. 6(a)). The substrate was then washed with freon 113 to remove unreacted material remaining on the surface. Thus, bonds formed by formula [16] were produced over the entire substrate surface.

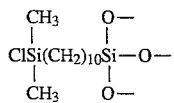  [Formula 16]

Figure 6B:
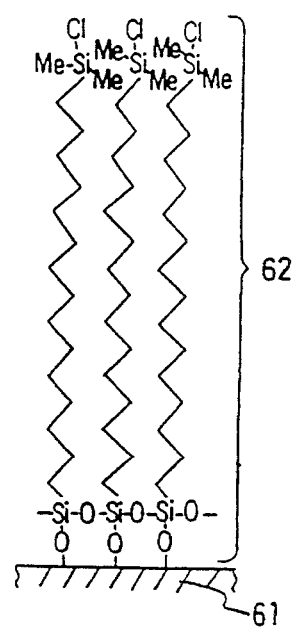

A monomolecular film 62 containing chlorosilyl groups (FIG. 6(b)) thus could be formed. The film was chemically (or covalently) bonded to the fiber surfaces.

The treated substrate was then dipped in an "Aflood" solvent containing 10% by weight of $CH_3NH_2$ for a dehydrochlorination reaction, and then washed with the "Aflood" solution. Thus, bonds formed by formula [17] were produced over the entire substrate surface.

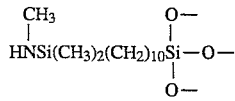  [Formula 17]

Figure 6C:
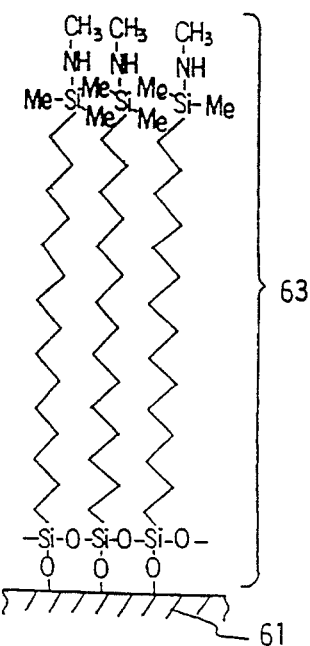

Thus, a hydrophilic monomolecular film 63 could be obtained (FIG. 6(c)). This monomolecular film was very firmly chemically (or covalently) bonded and did not separate. Also, it did not separate by washing or brushing.

EXAMPLE 7

(introduction of a —$N^+R_3X^-$ group (wherein X represents a halogen atom, and R represents a lower alkyl group)

Figure 7A:
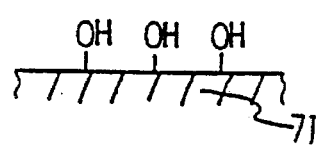
FIGS. 7 (a)–(d) show a glass substrate as in example 7 of the invention.

A hydrophilic glass substrate 71 was prepared (FIG. 7(a)), then washed. The substrate was dipped and held for about five hours in a non-aqueous solution containing an adsorbed material having a chlorosilyl group at each end, e.g., a mixed solution of 80% by weight of n-hexadecane (or toluene, xylene or bicyclohexyl), 12% by weight of carbon tetrachloride, and 8% by weight of chloroform, containing about 2% by weight of $ClSi(CH_3)_2(CH_2)_{10}SiCl_3$ A dehydrochlorination reaction was brought about between chlorosilyl (—SiCl) groups in the material containing a chlorosilyl group at each end and hydroxyl groups numerously contained at the substrate surface. The substrate was then washed with chloroform to remove unreacted material remaining on the surface. Thus, bonds formed by the formula [18] were produced over the entire substrate surface.

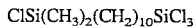  [Formula 18]

Figure 7B:
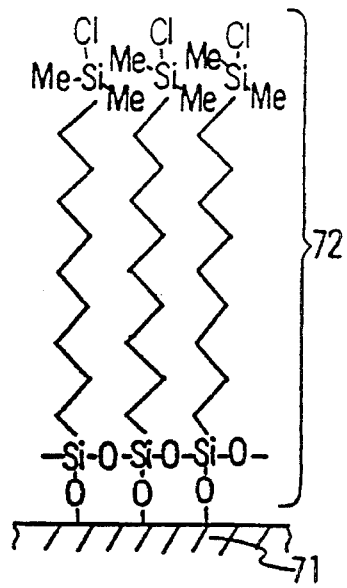
Figure 7C:
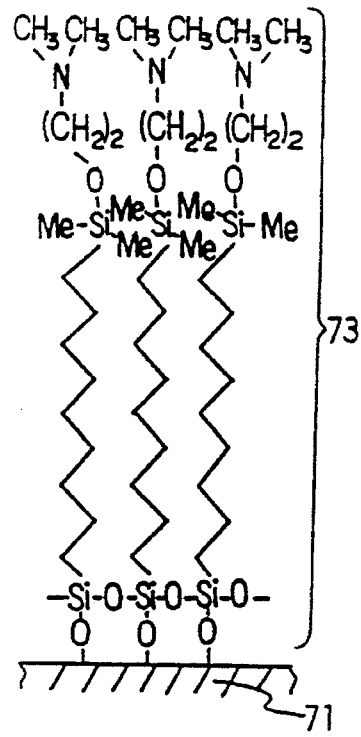

A monomolecular film 72 containing chlorosilyl groups thus could be formed. The film was chemically (or covalently) bonded to the fiber surfaces (FIG. 7(b)). The treated substrate was then dipped in a chloroform solution containing 10% by weight of $(CH_3)_2N(CH_2)_2OH$ causing a dehydrochlorination reaction. The substrate was then washed with chloroform. Thus, a monomolecular film 73 represented by formula [19] could be obtained (FIG. 7(c)).

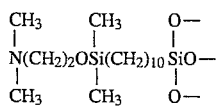  [Formula 19]

Figure 7D:
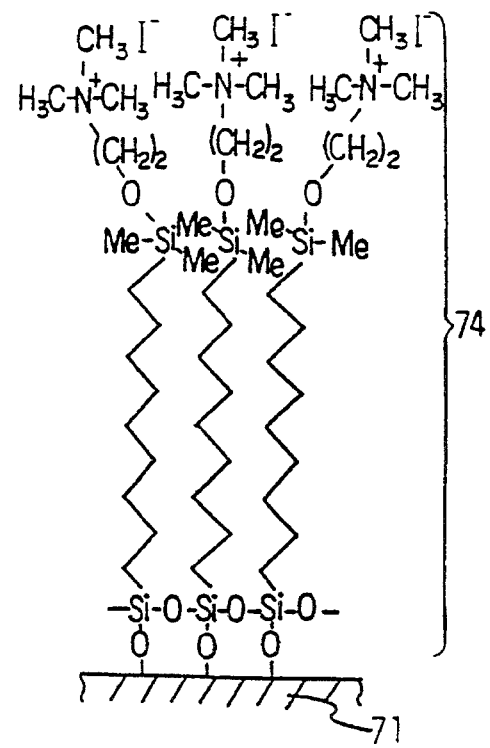

The substrate was then further dipped in a cyclohexane solution containing $CH_3I$, and the solution was circulated current for two hours. Thus, a very highly hydrophilic monomolecular film 74 could be obtained (FIG. 7(d)), which contained quarternary amino groups at the surface, as represented by formula [20].

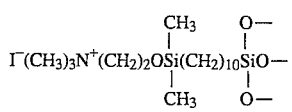  [Formula 20]

EXAMPLE 8

(introduction of an —$NO_2$ group)

Figure 8A:
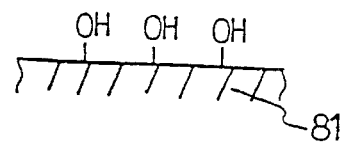
FIGS. 8 (a)–(c) show a glass substrate as in example 8 of the invention.

A hydrophilic glass substrate 81 FIG. 8(a) ) was prepared and washed with an organic solution. The substrate was dipped and held for about five hours in a non-aqueous solution containing an adsorbed material having a bromo or iodo group and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of $Br(CH_2)_{10}SiCl_3$.

A dehydrochloroination reaction was thus brought about between chlorosilyl (—SiCl) groups in the material containing a bromo or iodo and a chlorosilyl group and hydroxyl groups numerously contained at the substrate surface. The substrate was then washed with chloroform to remove unreacted material remaining on the surface. Thus, bonds formed by formula [21] were produced over the entire substrate surface.

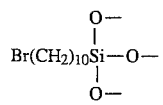  [Formula 21]

Figure 8B:
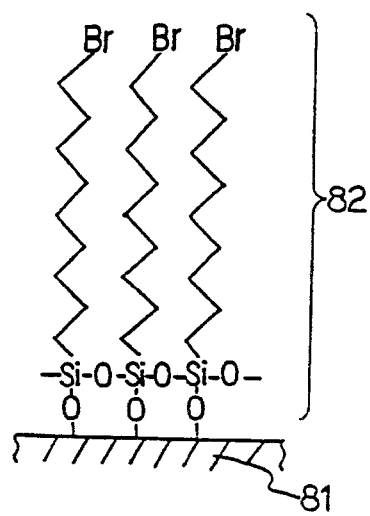

A monomolecular film 82 contaning bromo groups thus could be formed. The film was chemically (or covalently) bonded to the substrate surface, and its thickness was about 1.5 nm (FIG. 8(b)).

Figure 8C:
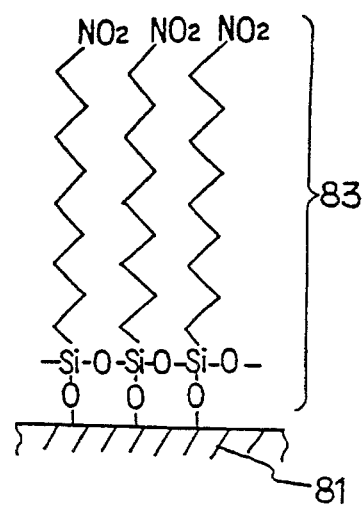

The treated substrate was then reacted in an alkaline aqueous solution containing 5% by weight of $AgNO_3$ at 80° C. for two hours. Thus, a hydrophilic monomolecular film 83 (FIG. 8(c)) represented by formula [22] could be obtained.

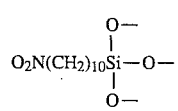  [Formula 22]

This momomolecular film was very firmly chemically (or covalently) bonded to the substrate and did not separate.

EXAMPLE 9

(introduction of a hydrogen sulfide (—SH) group)

Figure 9A:
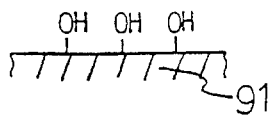
FIGS. 9 (a)–(e) show a glass substrate as in example 9 of the invention.

A hydrophilic glass substrate 91 (FIG. 9(a)) was prepared and washed with an organic solution. The substrate was dipped and held for about five hours in a non-aqueous solution containing an adsorbed material having thiocyano (—SCN) and chlorosilyl groups, e.g., a mixed solution of 80% by weight of n-hexadecane (or toluene, xylene or bicyclohexyl), 12% by weight of carbon tetrachloride, and 8% by weight of chloroform, containing about 2% by weight of $NCS(CH_2)_{10}SiCl_3$.

A dehydrochlorination reaction was thus brought about between chlorosilyl (—SiCl) groups in the material and hydroxyl groups numerously contained at the substrate surface. The substrate was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in formula [23]. Drying temperature may be room temperature or above.

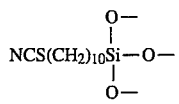

[Formula 23]

Figure 9B:
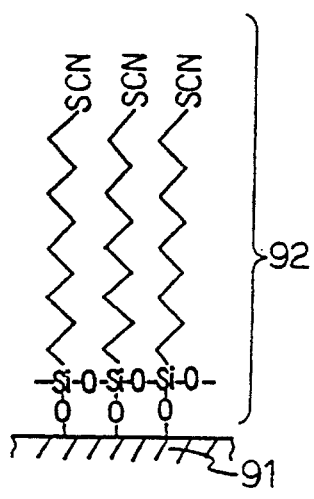

A monomolecular film 92 containing thiocyano groups thus could be obtained (FIG. 9(b)). The film was chemically (or covalently) bonded to the substrate surface. Its thickness was about 1.5 nm.

The treated substrate was then dipped in an ether solution containing lithium aluminum halide (10 mg/ml) for four hours. Thus, a hydrophilic monomolecular film 93 (FIG. 9(c)) represented by formula [24] was obtained.

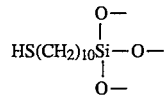

[Formula 24]

The film did not separate by washing.

EXAMPLE 10

(introduction of a —SO₃H group)

Figure 9C:
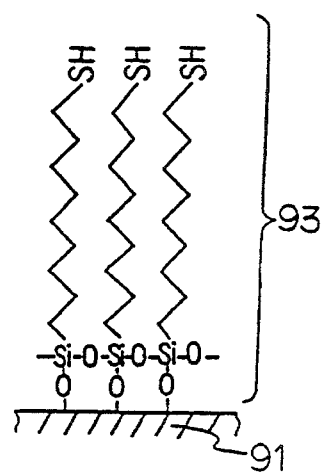
Figure 9D:
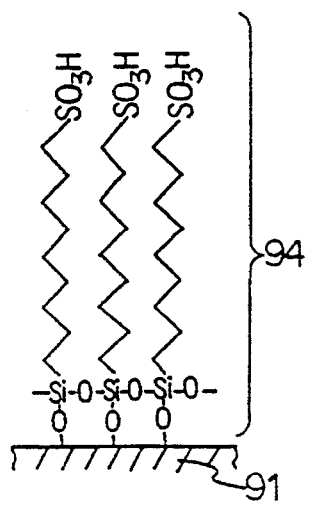
Figure 9E:
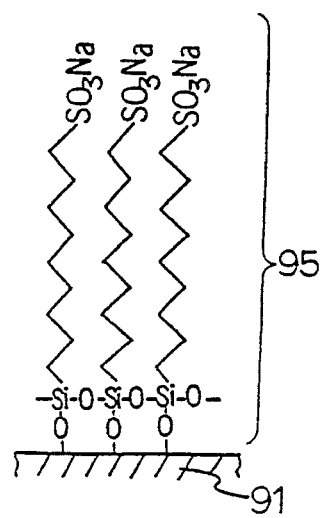

The monomolecular film 93 (FIG. 9(c)) obtained in Example 9 and represented by formula 25 shown above was dipped in a mixed solution containing 10% by weight hydrogen peroxide and 10% by weight acetic acid in a volume ratio of 1:5 at a temperature of 40° to 50° C. for 30 minutes. Thus, a highly hydrophilic monomolecular film 94 (FIG. 9(d)) represented by formula [25] was obtained.

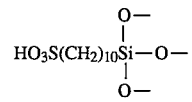

[Formula 25]

The treated substrate was then dipped in an aqueous solution obtained by dissolving about 2% by weight of an alkali, alkali earth metal or other metals compound, e.g., NaOH. Thus, a very highly hydrophilic film 95 (FIG. 9 (e)) represented by formula [26] was formed.

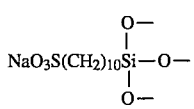

[Formula 26]

The film did not separate by wiping. The film had a very good hydrophilic property and the glass had an excellent fog-proof property.

In the above structure according to examples 7, 8, and 10, a hydrophilic monomolecular film or a laminated momomolecular film, which is excellently fog-proof and has a thickness at the nanometer level, is formed such that it is chemically bonded (or covalently bonded) to the substrate surface is, fog-proof and oil-repelling, and is excellently scratch-proof and wear-resistant. The film can be obtained without significantly effecting the transparency, tone and luster of the substrate.

EXAMPLE 11

(introduction of an —OH group)

Figure 10:
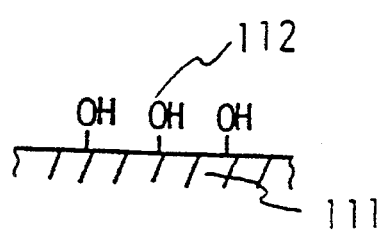
FIGS. 10 (a)–(d) show a glass substrate as in example 10 of the invention.
Figure 10:
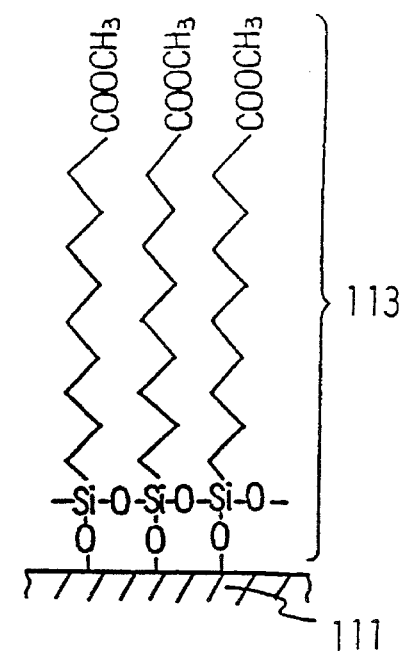
Figure 10:
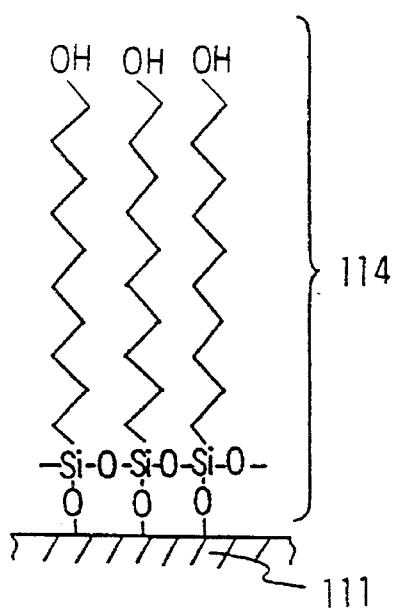
Figure 10:
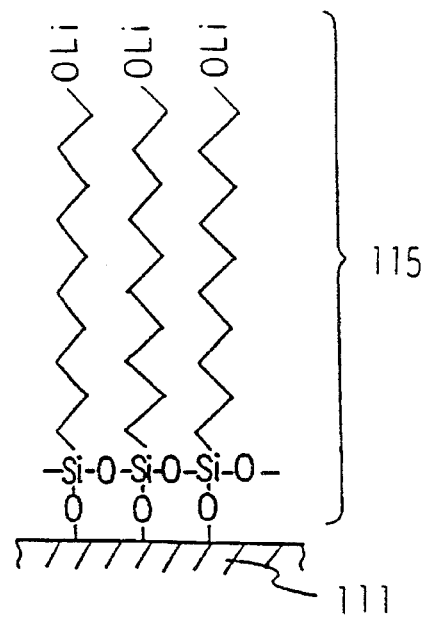

A glass mirror substrate 111 (FIG. 10(a)) was washed with an organic solution. The substrate was dipped and held for about five hours in a non-aqueous solution containing 80% by weight of n-hexadecane, 12% by weight of carbon tetrachloride and 8% by weight of chloroform, prepared by dissolving into the non-aqueous solution about 2% by weight of $CH_3OOC(CH_2)_7SiCl_3$.

A dehydrochlorination reaction was thus brought about between chlorosilane (—SiCl) groups in the material containing the ester bond and the chlorosilane group and hydroxyl groups 112 contained numerously at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying. Drying temperature may be room temperature or above.

Thus, bonds were formed as in formula [27].

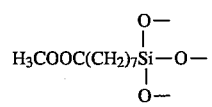

[Formula 27]

A monomolecular film 113 containing ester bonds thus was formed. The film was chemically (or covalently) bonded to the substrate surface. Its thickness was about 2.0 nm (FIG. 10(b)).

The treated glass mirror was then dippped in an ether solution containing several per cent by weight of lithium aluminium hydride (LiAlH₄) at room temperature for 20 minutes to introduce hydrophilic hydroxyl end groups. Thus, a monomolecular film 114 (FIG. 10(c)) represented by formula [28] was formed.

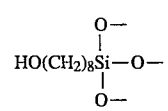

[Formula 28]

The monomolecular film 114 was very firmly chemically bonded (or covalently bonded) to the substrate and did not separate. The substrate was further dipped in a hexane solution containing an organic compound of an alkali metal, e.g., $Li(CH_2)_3CH_3$ (or NaOCH₃) to form a very lighly hydrophilic film 115 (FIG. 10(d)) represented by formula [29].

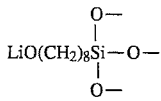
[Formula 29]

The monomlecular film had a water-wetting angle of 70 degrees, and did not fog in high humidity atmosphere. That is, the hydrophilic monomolecular film was formed on a substrate surface before reflecting layer forming, however it can be formed of the hydrophilic monomolecular film after reflecting layer forming.

EXAMPLE 12

(introduction of a —COOH group)

Figure 11A:
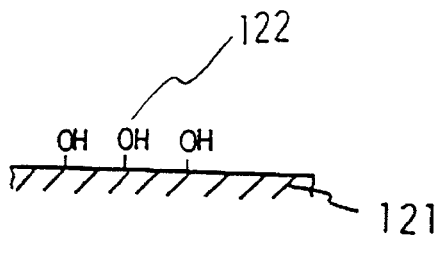
FIGS. 11 (a)–(d) show a glass mirror as in example 11 of the invention.

A window glass substrate 121 (FIG. 11(a)) was washed with an organic solution. The substrate was dipped and held for about five hours in a non-aqueous solution containing a functional group having an ester bond and a chlorosilane group, e.g., a solution containing 80% by weight of n-hexadecane, 12% by weight of carbon tetrachloride and 8% by weight of chloroform, prepared by dissolving into the non-aqueous solution about 2% by weight of $CH_3OOC(CH_2)_{10}SiCl_3$.

A dehydrochlorination reaction was thus brought about between chlorosilane (—SiCl) groups in the material and hydroxyl groups 122 numerously contained at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [30]. Drying temperature may be room temperature or above.

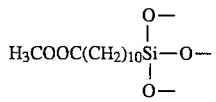
[Formula 30]

Figure 11B:
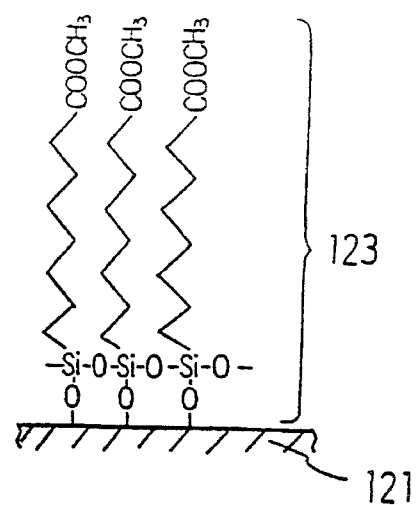

A monomolecular film 123 containing ester bonds thus could be formed. The film was chemically (or covalently) bonded to the substrate surface. Its thickness was about 2.0 nm (FIG. 11(b)).

The treated substrate was then dipped and held in a solution containing 36% by weight of hydrochloric acid (HCl) for reaction at 65° C. for 30 minutes to introduce hydrophilic end carboxyl groups as represented by formula [31].

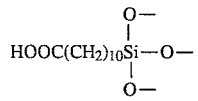
[Formula 31]

Figure 11C:
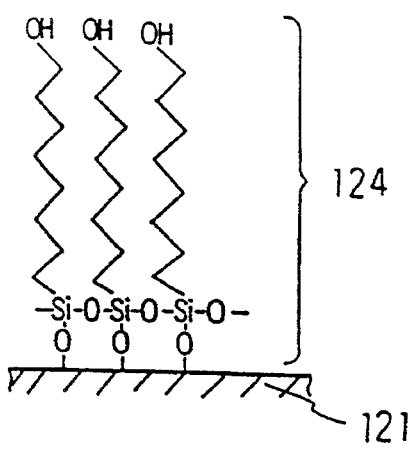
Figure 11D:
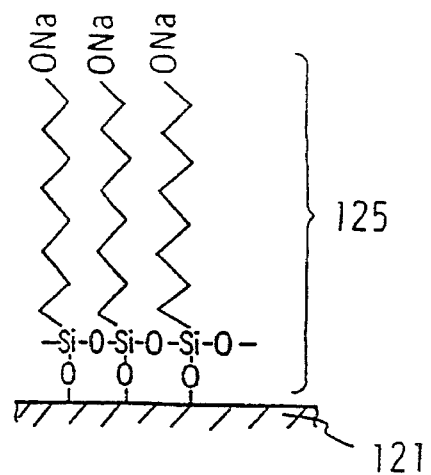

A monomolecular film 124 (FIG. 11(c)) thus could be obtained. The film was firmly chemically (or covalently) bonded to the surface and did not separate. The monomlecular film did not fog in a high humidity atmosphere. By treating the chemically adsorbed film with diluted NaOH (or Ca(OH)$_2$) aqueous solution, the carboxylic acid of the film was changed to sodium carboxylic acid salt 125 (FIG. 11(d)) as in the formula [32]. The monomlecular film had a water-wetting angle of 70 degrees, and did not fog in a high humidity atmosphere.

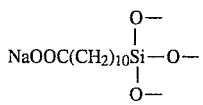
[Formula 32]

EXAMPLE 13

(introduction of an —NH$_2$ group)

A window glass 131 was prepared (FIG. 12(a)). The window glass was dipped and held for about 30 minutes in a water solution containing bichromic acid and washed with water. The window glass was dipped and held for about two hours in a non-aqueous solution containing an adsorbed material having a cyano and a chlorosilyl group, e.g., a mixed solution containing 80% by weight of n-hexadecane (or toluene, xylene or bicyclohexyl), 12% by weight of carbon tetrachloride and 8% by weight of chloroform, prepared dissolving into the non-aqueous solution about 1% by weight of $NC(CH_2)_{17}SiCl_3$.

A dehydrochlorination reaction brought about between chlorosilane (—SiCl) groups in the material and hydroxyl groups 132 contained numerously at the substrate surface. The substrate was then washed with chloroform to remove unreacted material remaining on the surface, followed by washing with water or exposing to air containing moisture. The residual —SiCl groups were changed to —SiOH groups. Each silanol group was then dehydrated and crosslinked to form a siloxane bond after drying as in the formula [33]. Drying temperature may be room temperature or above.

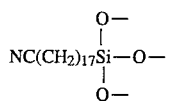
[Formula 33]

A monomolecular film 133 containing cyano groups thus could be formed. The film was chemically (or covalently) bonded to the surfaces (FIG. 12(b)).

The treated window glass was then dipped in an ether solution containing dissolved lithium aluminium hydride (10 mg/ml) for overnight reaction. Then, the window glass was taken out from the solution and added to an ether solution containing 10% by weight hydrochloric acid. Thereafter, it was dipped and held in a triethylamine solution for two hours and washed with chloform. A highly hydrophilic monomolecular film 134 (FIG. 12(c)) represented by formula [34] was formed.

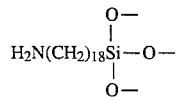
[Formula 34]

As an additional example of —NH$_2$ group introduction, window glass was water washed and dipped and held for about two hours in a non-aqueous solution containing a material containing a bromo or iodo group and a chlorosilane group, e.g., a solution of 80% by weight of n-hexadecane (or toluene, xylene or bicyclohexyl), 12% by weight of carbon tetrachloride and 8% by weight of chloroform, containing about 1% by weight of $Br(CH_2)_{17}SiCl_3$.

A dehydrochlorination reaction was thus brought about between chlorosilane (—SiCl) groups in the material and hydroxyl groups numerously contained at the window glass surface. Thus, bonds represented by formula [35] over the entire window glass surface were formed.

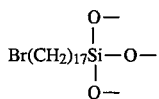
[Formula 35]

A monomolecular film containing bromo groups thus could be formed. The film was chemically (or covalently) bonded to the window glass surface. The treated window glass was then dipped in an N,N-dimethyl formamide solution containing sodium amide dissolved therein (8 mg/ml) for overnight reaction. Thus, a monomolecular film represented by formula [36] was obtained.

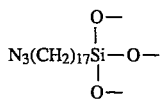
[Formula 36]

Further, the material was dipped in an ether solution containing lithium aluminium hydride dissolved therein (10 mg/ml) for overnight reaction. Then, it was put in an empty container, and an ether solution containing 10% by weight of hydrochloric acid was added. Thereafter, it was dipped in a triethylamine solution for two hours and then washed with a chloroform solution. Thus, a monomolecular film represented by formula [37] which was fog-proof and had a water-wetting angle of 60 degrees, could be obtained.

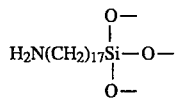
[formula 37]

The film was very firmly chemically (or covalently) bonded to the window glass surface and did not separate at all.

EXAMPLE 14

(introduction of a —N$^+$R$_3$X$^-$ group (wherein X represents a halogen atom, and R represents a lower alkyl group)

Figure 13A:
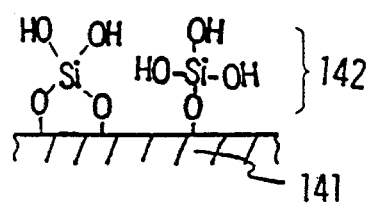
FIGS. 13 (a)–(d) show a window glass as in example 13 of the invention.

A polycarbonate optical lens substrate (or acryl resin plate substrate) surface was oxygen plasma treated in a UV dry stripper ("UV-1" manufactured by Samco International Co.) at an oxygen flow rate of 1 liter/min. 300 w, for 20 minutes to oxidize the surface. The substrate was dipped and held at 80° C. for about 30 minutes in a water solution containing a bichromic acid and washed with water. The substrate 141 was washed with an organic solvent. The substrate was dipped and held for about one hour in a non-aqueous solution containing about 2% by weight of SiCl$_4$ in a freon 113 solution. The substrate was subsequently washed with a solvent, e.g., freon 113, and then washed with water. As a result, the substrate surface had a siloxane monomolecular film (inner layer) 142 (FIG. 13(a)) as represented above in formulas [A] and/or [B].

The substrate was dipped and held for about five hours in a non-aqueous solution containing a chlorosilane group at each end, e.g., a freon 113 solution containing about 2% by weight of ClSi(CH$_3$)$_2$(CH$_2$)$_{10}$SiCl$_3$.

Figure 13B:
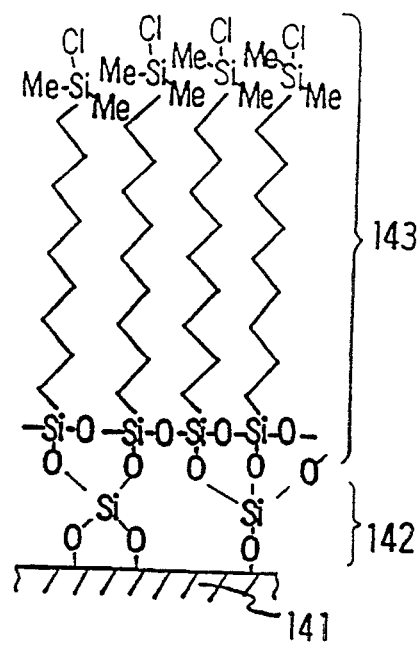

A dehydrochlorination reaction was brought about between chlorosilane (—SiCl) groups in the material containing a chlorosilane group at each end and hydroxyl groups contained at the inner layer surface. Thus, bonds represented by formula [38] were produced over the entire substrate surface. A monomolecular film 143 containing chlorosilane groups thus could be formed. The film was chemically (or covalently) bonded to the substrate surface (FIG. 13(b)).

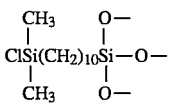
[Formula 38]

Figure 13C:
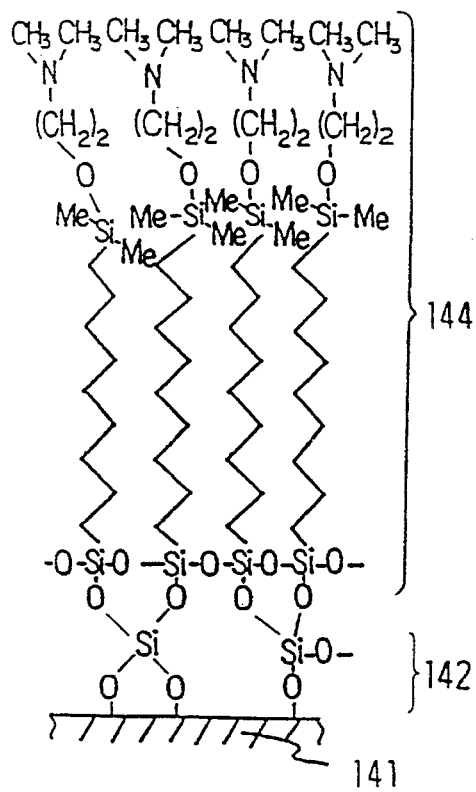

The treated substrate was then dipped in a freon 113 solution containing 10% by weight of (CH$_3$)$_2$N(CH$_2$)$_2$OH for a dehydrochlorination reaction, and then washed with freon 113. Thus, a monomolecular film 144 (FIG. 13(c)) represented by formula [39] was obtained.

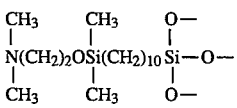
[Formula 39]

Figure 13D:
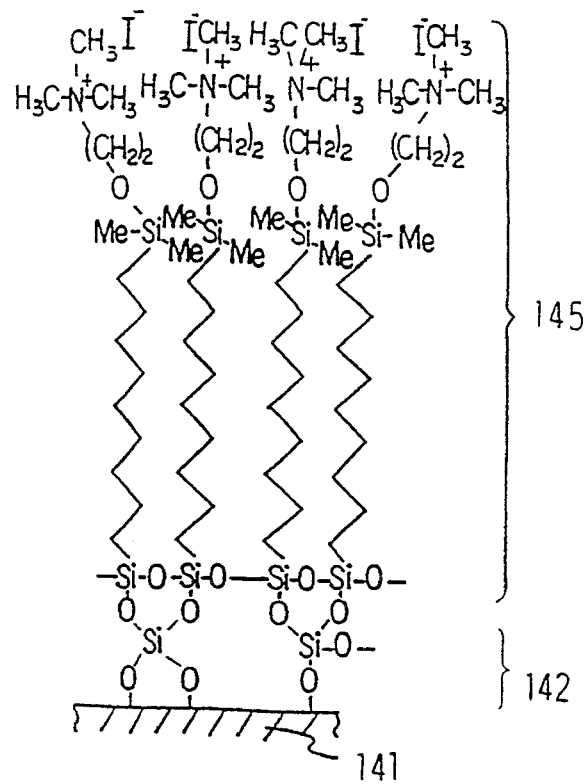

The substrate thus obtained was refluxed in a chloroform solution containing CH$_3$I for two hours. Thus, substrate 145 (FIG. 13(d)) having surface quarternary amino groups represented by formula [40] and being very highly wetted by water were obtained.

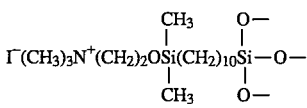
[Formula 40]

The monomlecular film had a water-wetting angle of 50 degrees, and did not fog in a high humidity atmosphere.

EXAMPLE 15

(introduction of an —NO$_2$ group)

Figure 14A:
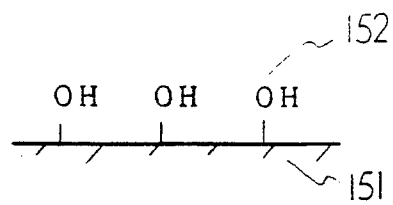
FIGS. 14 (a)–(c) show a transparent polycarbonate optical lens as in example 14 of the invention.

A glass substrate 151 (FIG. 14(a)) was washed with an organic solvent and dipped and held for about five hours in a non-aqueous solution containing a bromo or iodo group or a chlorosilane group, e.g., a solution of 80% by weight of n-hexadecane (or toluene, xylene or bicyclohexyl), 12% by weight of carbon tetrachloride and 8% by weight of chloroform, containing about 2% by weight of a compound represented by formula [41].

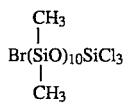
[Formula 41]

A dehydrochlorination reaction was brought about between chlorosilane (—SiCl) groups in the material containing a bromo or iodo group and a chlorosilane group and hyroxyl groups 152 numerously contained at the substrate surface. Thus, bonds represented by formula [42] were produced over the entire substrate surface.

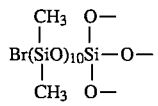
[Formula 42]

Figure 14B:
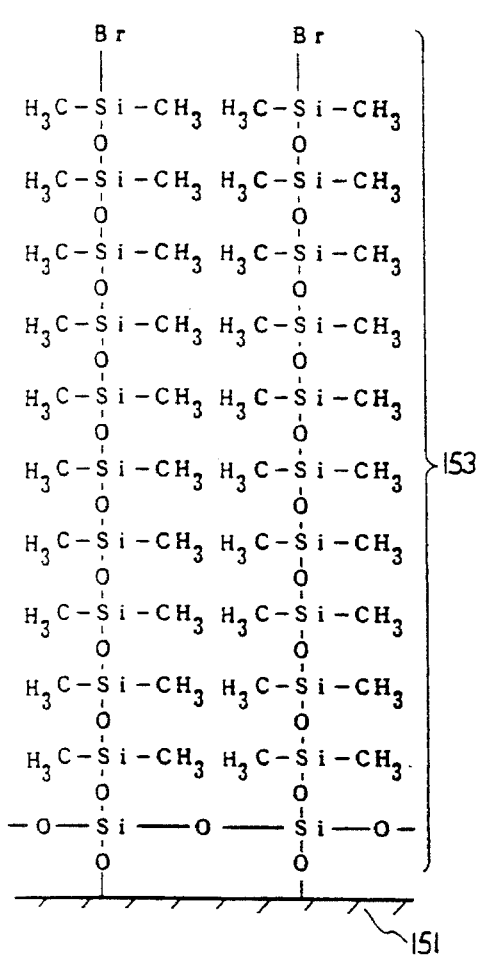
Figure 14C:
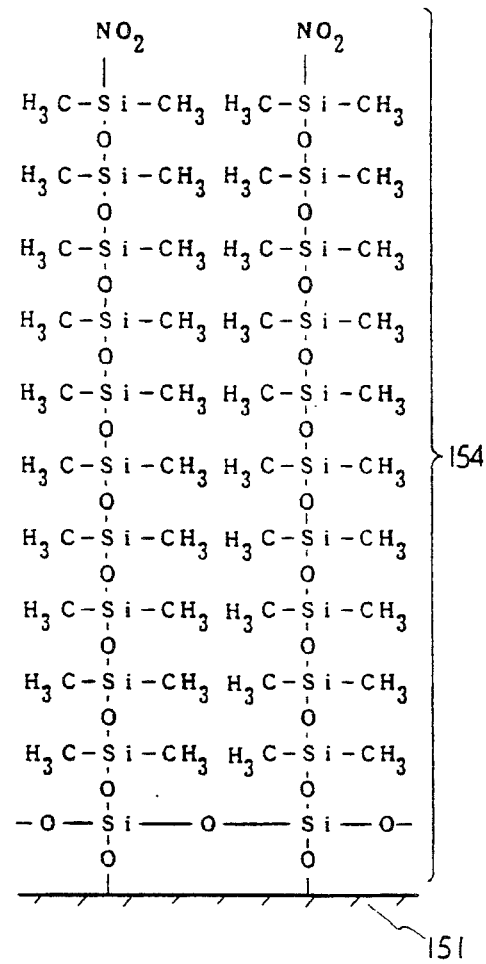

A monomolecular film 153 containg bromo groups thus was formed. The film was chemically (or covalently) bonded to the substrate surface. Its thickness was about 2.5 nm (FIG. 14(b)). The treated substrate was then dipped in an aqueous alkaline solution containing 5% by weight of $AgNO_3$ for reaction at 80° C. for two hours. Thus, a hydrophilic monomolecular film 154 (FIG. 14(c)) as represented by formula [43] was obtained.

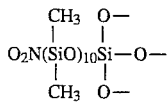  [Formula 43]

The monomolecular film had a water-wetting angle of 70 degrees, and did not fog in a high humidity atmosphere.

EXAMPLE 16

(introduction of a —$SO_3H$ group)

Figure 15A:
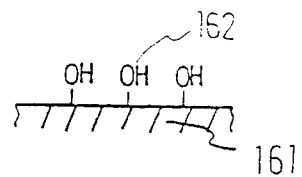
FIGS. 15 (a)–(e) show a glass substrate as in example 15 of the invention.

A spectacle glass lens 161 (FIG. 15(a)) was washed with an organic solvent and dipped and held for about five hours in a non-aqueous solution containing a material containing a thiocyano (—SCN) and a chlorosilane group, e.g., a solution of 80% by weight of n-hexadecane (or toluene, xylene or bicyclohexyl), 12% by weight of carbon tetrachloride and 8% by weight of chloroform, containing 2% by weight of $NCS(CH_2)_{10}SiCl_3$.

A dehydrochlorination reaction was brought about between chlorosilyl (—SiCl) groups in the glass containing a thiocyano and a chlorosilane group and hydroxyl groups 162 numerously contained at the glass surface. Thus, bonds represented by formula [44] were produced over the entire glass surface.

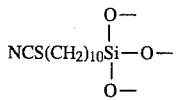  [Formula 44]

Figures 15B, 15C:
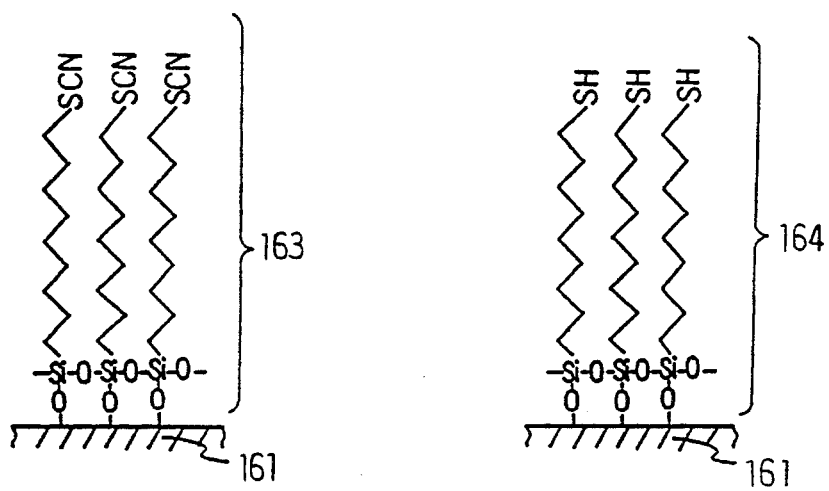

A monomolecular film 163 containing thiocyano groups thus was formed. The film was chemically (or covalently) bonded to the glass surface. Its thickness was about 2.0 nm (FIG. 15(b)).

The treated glass was then dipped in an ether solution containing lithium aluminum halide dissolved therein (10 mg/ml) for four hours. Thus, a hydrophilic monomolecular film 164 (FIG. 15(c)) represented by formula [45] was obtained.

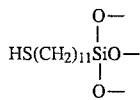  [Formula 45]

Figures 15D, 15E:
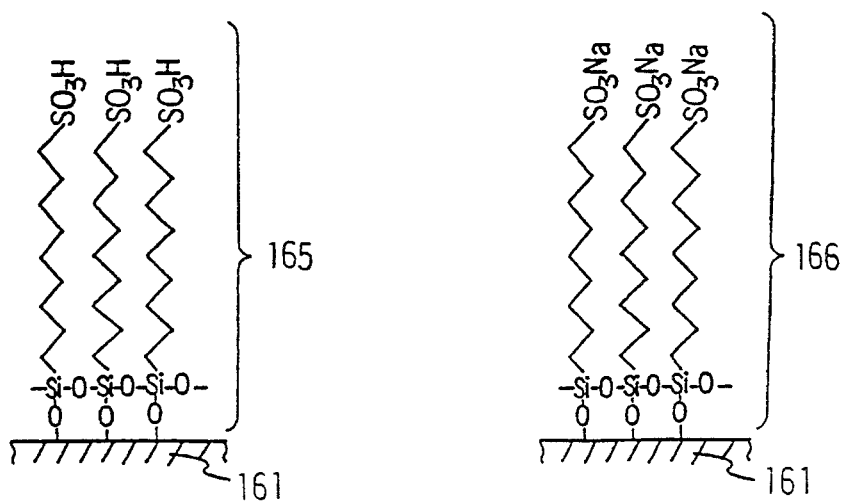

The treated glass thus obtained was further dipped in a mixed solution containing 10% by weight of hydrogen peroxide and 10% by weight of acetic acid in a volume ratio of 1:5 at a temperature of 40° to 50° C. for 30 minutes. Thus, a highly hydrophilic monmolecular film 165 (FIG. 15(d)) as represented by formula [46] was obtained.

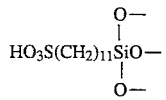  [Formula 46]

The glass was then further dipped and held in an aqueous solution containing an alkali, alkali earth metal or other metals compound, e.g., containing 2% by weight of NaOH (or $Ca(OH)_2$) thus, bonds were formed as in formula [47].

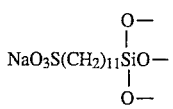  [Formula 46]

The monomlecular film 166 had a water-wetting angle of 45 degrees, and did not fog in high humidity atmosphere.

EXAMPLE 17

Figure 16:
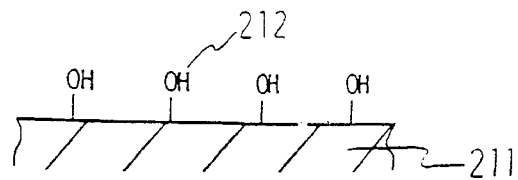
FIGS. 16 (a)–(c) show a glass spectacle lens as in example 16 of the invention.
Figure 16:
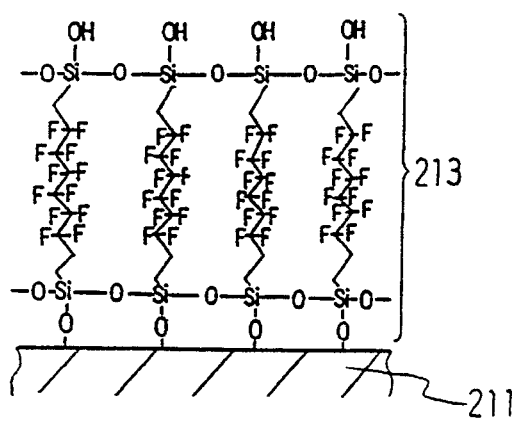
Figure 16:
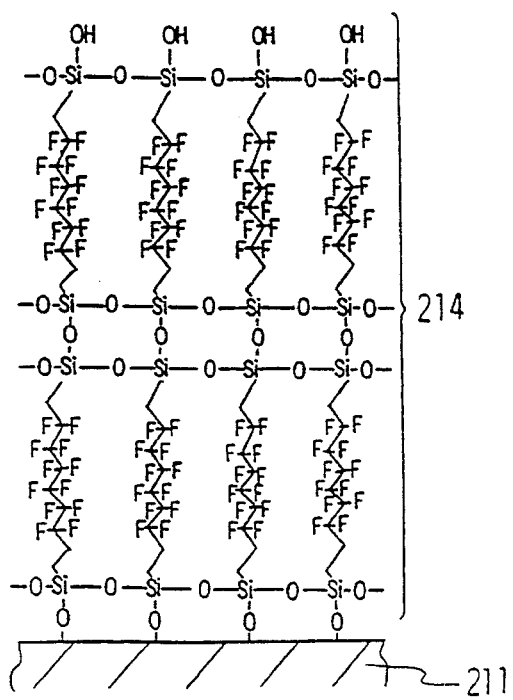

As shown in FIG. 16(a), a hydrophilic poly(ethylene terephthalate) film substrate 211 was prepared. The substrate surface was oxidized. The surface may be oxidized, for example, to be hydrophilic by treating with dichromic acid. After drying well, the substrate was dipped and held for about two hours in a freon 113 solution. The solution was prepared by dissolving a chemical adsorbed material having two trichlorosilyl groups at molecule ends, for example

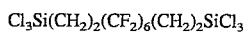

to a concentration of about 2 wt. %. Since the surface of the glass substrate 211 contained many hydroxyl groups 212, a dehydrochlorination reaction was thus brought about between —SiCl groups at either end of molecules of the chemical adsorbed material, producing bonds represented by the formula [48] over the entire substrate surface.

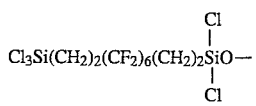  [Formula 48]

Subsequently, the substrate was washed well using an organic solvent (i.e., freon 113) to remove excess chemical adsorbed material remaining on its surface, and then washed with water and dried. As a result, a siloxane-based monomolecular layer represented by the formula [49] was formed such that it was secured by chemical bonds (or covalent bonds) to the substrate surface.

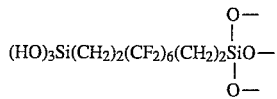  [Formula 49]

The chemical bond is via a siloxane bond. The formation of the chemically adsorbed monomolecular film 213 was confirmed by FTIR spectroscopy and the thickness was about 1.5 nanometers (nm), as shown in FIG. 16(b). It was firmly bonded such that it did not separate.

By subsequently carrying out the steps, from the chemical adsorption step to the water washing and drying step, a di-molecular layer 214 as shown in FIG. 16(c) was obtained. The formation of the chemically adsorbed monomolecular film was confirmed by FTIR spectroscopy and the thickness was about 3.0 nanometers (nm). It was firmly bonded such that it did not separate.

Likewise, by repeating the steps from the chemical adsorption step to the water washing and dry step for a required number of layers, a laminated monomolecular chemically adsorbed film based on fluorocarbon was obtained, the surface of which was covered by hydroxyl groups, and which was a little hydrophilic, fog-proof, oil-repelling and had a very high adhesion. While in the above the Examples, $Cl_3Si(CH_2)_2(CF_2)_6(CH_2)_2SiCl_3$ were used, other compounds may be used as well. Examples of such compounds are $$Cl_3Si(CH_2)_2(CF_2)_8(CH_2)_2SiCl_3,$$

$$Cl-\underset{\underset{CH_3}{|}}{\overset{\overset{CH_3}{|}}{Si}}(CH_2)_2(CF_2)_6(CH_2)_2-SiCl_3,$$

$$Cl-\underset{\underset{CH_3}{|}}{\overset{\overset{CH_3}{|}}{Si}}(CH_2)_2(CF_2)_8(CH_2)_2-SiCl_3, \text{ and}$$

$$Cl_3Si(CH_2)_2(CF_2)_6(CH_2)_2-\underset{\underset{CH_3}{|}}{\overset{\overset{CH_3}{|}}{Si}}-Cl,$$

EXAMPLE 18

Figure 17:
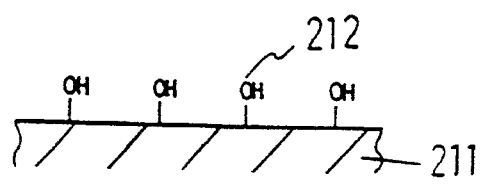
FIGS. 17 (a)–(d) show a poly(ethylene terephtarate) film as in example 17 of the invention.
Figure 17:
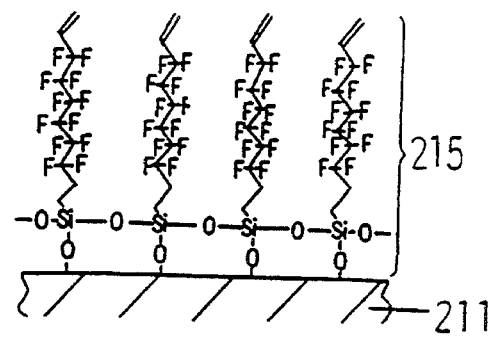
Figure 17:
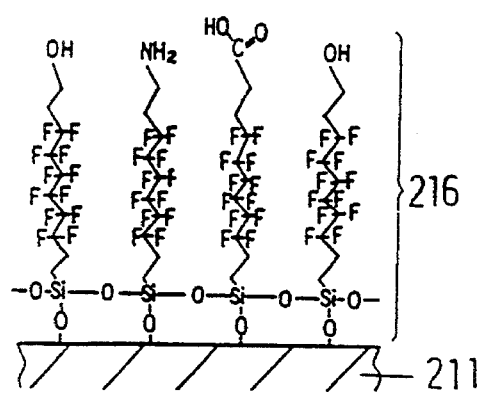
Figure 17:
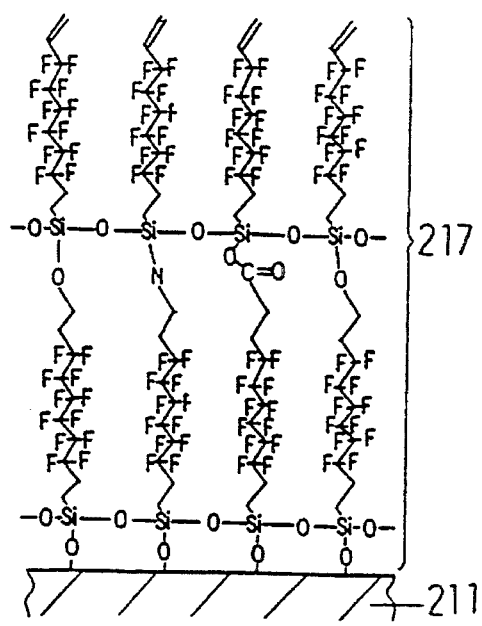

As shown in FIG. 17(a), a hydrophilic glass substrate 211 was prepared. After drying well, the substrate was dipped and held for about two hours in a solution of 80 wt. % n-hexadecane (or toluene or xylene or bicyclohexyl), 12 wt. % of carbon tetrachloride and 8 wt. % chloroform, the solution being a chemical adsorbed material containing 1 wt. % of the molecule of which had a trichlorosilyl group at one end and had a vinyl group at the other end; for example:

$$CH_2=CH-(CF_2)_6-(CH_2)_2SiCl_3$$

Since the surface of the ceramic substrate contained many hydroxyl groups 212, a dehydrochlorination reaction was brought about between —SiCl groups of the chemical adsorbed material and hydroxyl groups of the substrate surface. A monomolecular layer represented by the formula [49]:

$$CH_2=CH-(CF_2)_6-(CH_2)_2\underset{\underset{Cl}{|}}{\overset{\overset{Cl}{|}}{Si}}O- \quad \text{[Formula 49]}$$

was formed over the entire substrate surface.

The substrate was then washed with freon 113 to remove the unreacted material remaining on the surface, followed by washing with water or exposing to air containing moisture. The —SiCl group was changed to a —SiOH group as in formula [50].

$$H_2=CH(CF_2)_6(CH_2)_2-\underset{\underset{OH}{|}}{\overset{\overset{OH}{|}}{Si}}O- \quad \text{Formula [50]}$$

Each silanol group (—SiOH) was then dehydrated and crosslinked to form a siloxane bond (—SiO—) after drying as in formula [51]. Drying temperature may be room temperature or above.

$$CH_2=CH(CF_2)_6(CH_2)_2-\underset{\underset{O-}{|}}{\overset{\overset{O-}{|}}{Si}}O-+nH_2O \quad \text{Formula [51]}$$

An adsorbed monomolecular film 215 was obtained on the surface of the substrate as shown FIG. 17(b). The adsorbed monomolecular film has a fluorocarbon group and is chemically bonded (i.e., covalently bonded) to the substrate. The chemical bond is via a siloxane bond. The formation of the chemically adsorbed monomolecular film was confirmed by FTIR spectroscopy and the thickness was about 1.5 nanometers (nm). It was firmly bonded such that it did not separate.

The substrate was irradiated with an energy beam such as an electron beam, an ion beam, gamma rays or ultraviolet ways in a reactive gas atmosphere (for instance irradiated with about 5 Mrads. of an electron bean in air). As a result, a monomolecular layer 216 represented by formulas [52] to [54]:

$$HO-(CH_2)_2-(CF_2)_6-(CH_2)_2-\underset{\underset{O-}{|}}{\overset{\overset{O-}{|}}{Si}}O- \quad \text{[Formula 52]}$$

$$H_2N-(CH_2)_2-(CF_2)_6-(CH_2)_2-\underset{\underset{O-}{|}}{\overset{\overset{O-}{|}}{Si}}O- \quad \text{[Formula 53]}$$

$$\overset{\overset{O}{\|}}{HOC}-(CH_2)_2-(CF_2)_6-(CH_2)_2-\underset{\underset{O-}{|}}{\overset{\overset{O-}{|}}{Si}}O- \quad \text{[Formula 54]}$$

formed such that it was chemically bonded to the surface, as shown in FIG. 17(c).

By carrying out the steps from the chemical adsoprtion step using $$CH_2=CH-(CF_2)_6(CH_2)_2SiCl_3$$

to the water washing step, a di-molecular film 217 containing fluorocarbon groups as shown in FIG. 17(d) was obtained.

Likewise, by repeating the steps from the chemical adsorption step to the energy beam irradiation step for a desired number of layers, a laminated chemically adsorbed monomolecular film was obtained, the surface of which was covered by hydroxyl groups and/or imino groups, and which was a little hydrophilic and oil-repelling and had a very high adhesion.

EXAMPLE 19

Figure 18A:
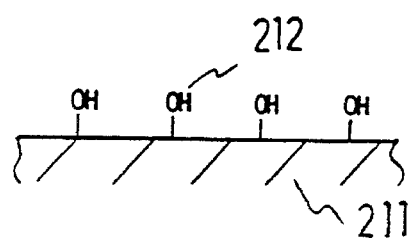
FIGS. 18 (a)–(d) show a glass substrate as in example 18 of the invention.
Figure 18B:
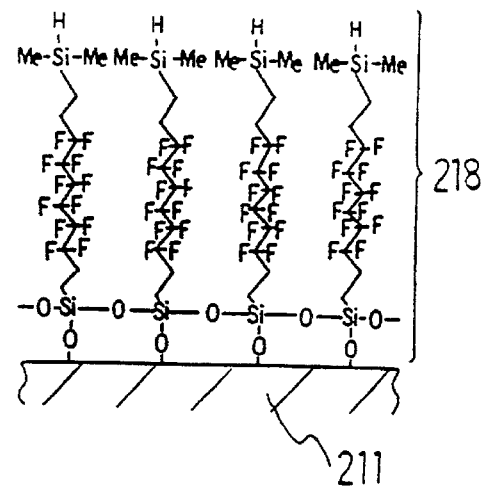
Figure 18C:
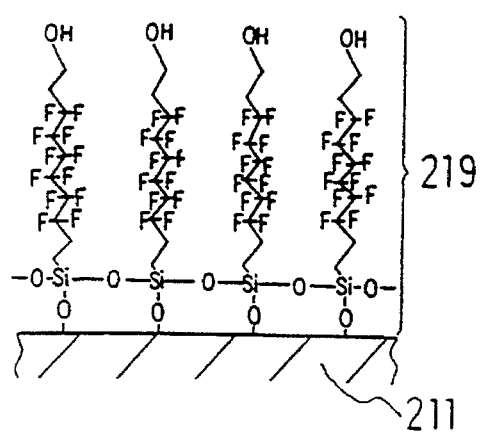
Figure 18D:
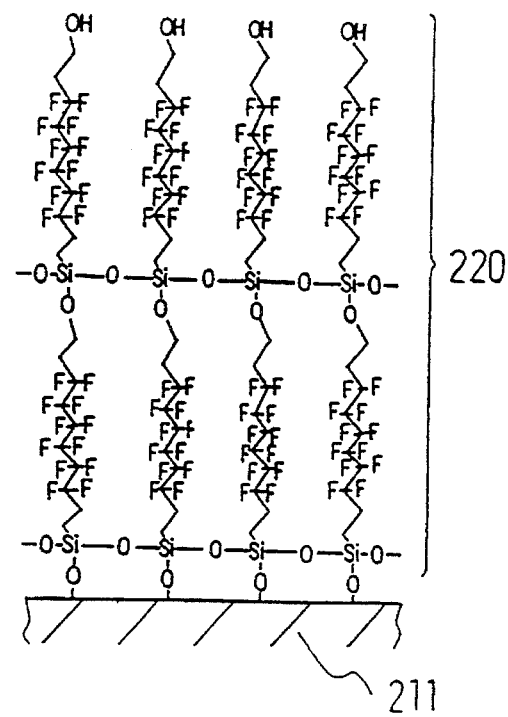

As shown in FIG. 18(a), a polycarbonate substrate having a thickness of 1.2 mm and a diameter of 60 mm was fixed to another polycarbonate substrate using a UV-setting adhesive. The substrate thus obtained was oxygen plasma treated in a UV dry stripper ("UV-1" manufactured by Samco International Co.) at an oxygen flow rate of 1 liter/min. for 10 minutes to oxidize the surface. The substrate was dipped and held in a freon 113 solution containing the chemical adsorbed material:

$$HSi(CH_3)_2(CH_2)_2(CF_2)_6(CH_2)_2SiCl_3$$

at a concentration of about 2 wt. %. Since the surface of the hydrophilic substrate contained many hydroxyl groups 212, a dehydrochlorination reaction was brought about between —SiCl groups of the chemical adsorbed material and hydroxyl groups of the substrate surface. A monomolecular layer as represented by formula [55]:

$$\text{HSi(CH}_3\text{)(CH}_2\text{)}_2(CF_2)_6(CH_2)_2\text{SiO(Cl)(CH}_3\text{)} \quad \text{[Formula 55]}$$

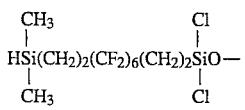

was formed over the entire substrate surface.

The substrate was then washed well with an organic solvent (i.e., freon 113) to remove non-reacted chemical adsorbed material remaining on its surface. A laminated chemically adsorbed monomolecular film 218 based on fluorocarbon was obtained by the formula [56] which had its surface covered by —SiH groups, as shown in FIG. 18(*b*).

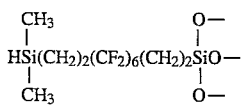

[Formula 56]

The substrate was treated for about 10 hours with a $H_2O_2$ solution containing KF, $KHCO_3$, MeOH and THF. A monomolecular layer 219 represented by the formula [57] was thus formed such that it was chemically bonded to the surface, as shown in FIG. 18(*c*).

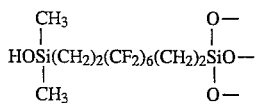

[Formula 57]

By subsequently carrying out the steps from the chemical adsorption step using

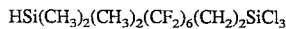

$$HSi(CH_3)_2(CH_2)_2(CF_2)_6(CH_2)_2SiCl_3$$

to the $H_2O_2$ treatment step, a laminated molecular film 220 containing carbon fluoride groups shown in FIG. 18(*d*) was obtained.

Likewise, by repeating the steps from the chemical adsorption step to the $H_2O_2$ treatment step for a desired number of layers, a laminated chemically adsorbed monomolecular film based on fluorocarbon could be obtained, which had its surface covered by hydroxyl groups, was a little hydrophilic and oil-repelling and had a very high adhesion.

By using

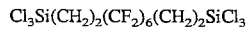

$$Cl_3Si(CH_2)_2(CF_2)_6(CH_2)_2SiCl_3$$

in the last chemical adsorption step in the above example, a laminated chemically adsorbed monomolecular film based on fluorocarbon, the surface of which is fog-proof, water- and oil-repelling, and transparent can be obtained.

That is, since the fluorine-containing monomolecular film is formed on a substrate surface via siloxane bonds (or covalent bonds), it is excellently scratch-proof, wear-resistant, fog-proof and oil-repelling. Further, since many hydrophilic groups are secured to the surface of chemically adsorbed monomolecular film, excellent fog-proof and oil-repelling properties can be obtained.

Further, with the preferred structure according to the invention, a laminated chemically adsorbed film containing fluorine is formed, and an excellently oil-repelling film can be obtained.

Further, with the method of manufacture according to the invention a fog-proof and oil-repelling monomolecular film according to the invention can be manufactured efficiently and effectively. Further, by repeatedly carrying out the method of manufacture, a laminated film can be obtained efficiently.

Further, with the method of manufacture according to the invention, a fog-proof oil-repelling laminated monomolecular film can be manufactured efficiently and logically.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A hydrophilic chemically adsorbed film comprising a straight fluorocarbon chain having one end bonded by covalent Si bonds to a substrate surface, wherein said chemically adsorbed film contains hydrophilic functional groups at the outermost surface, and said hydrophilic functional groups include at least one functional group selected from the group consisting of —SCN, —$NH_2$, =NH, —$N^{30}R_3X^-$, —$NO_2$, —SH, and —$SO_3H$ groups, where X represents a halogen atom, R represents a methyl group, and the hydrogen atoms in the $SO_3H$ groups are substituted by an alkali metal or an alkali earth metal.

2. The hydrophilic chemically adsorbed film according to claim 1, wherein said chemically adsorbed film is a monomolecular film or a polymer film.

3. The hydrophilic chemically adsorbed film according to claim 1, wherein said substrate is an optical substrate.

4. The hydrophilic chemically adsorbed film according to claim 1, wherein said hydrophilic chemically adsorbed film is laminated on the surface of an inner layer film containing siloxane bonds.

* * * * *